United States Patent
Gordon et al.

(10) Patent No.: US 10,820,574 B2
(45) Date of Patent: Nov. 3, 2020

(54) SPECIALIZED CONTEXTUAL DRONES FOR VIRTUAL FENCES

(71) Applicant: International Business Machines Corporation, Armonk, NY (US)

(72) Inventors: Michael S. Gordon, Yorktown Heights, NY (US); James Robert Kozloski, New Fairfield, CT (US); Ashish Kundu, Elmsford, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 15/223,351

(22) Filed: Jul. 29, 2016

(65) Prior Publication Data
US 2018/0027772 A1    Feb. 1, 2018

(51) Int. Cl.
*A01K 15/02* (2006.01)
*A01K 57/00* (2006.01)
(Continued)

(52) U.S. Cl.
CPC .......... *A01K 15/023* (2013.01); *A01K 1/0029* (2013.01); *A01K 29/005* (2013.01);
(Continued)

(58) Field of Classification Search
CPC .. A01K 15/023; A01K 15/021; A01K 29/005; A01K 27/009; A01K 1/0029;
(Continued)

(56) References Cited

U.S. PATENT DOCUMENTS

| | | | |
|---|---|---|---|
| 4,757,481 A | 7/1988 | Orr et al. | |
| 5,521,817 A | 5/1996 | Burdoin et al. | |

(Continued)

FOREIGN PATENT DOCUMENTS

| | | |
|---|---|---|
| AU | 2014100500 A4 | 6/2014 |
| CN | 1648962 A | 8/2005 |

(Continued)

OTHER PUBLICATIONS

Garling, "Drone, Drone on the Range," Modem Farmer, Jul. 8, 2013, 4 pages, http://modernfarmer.com/2013/07/drones-drones-on-the-range/.

(Continued)

*Primary Examiner* — Isaac G Smith
(74) *Attorney, Agent, or Firm* — Amin, Turocy & Watson, LLP

(57) ABSTRACT

Techniques for drone device control are provided. In one example, a computer-implemented method comprises establishing, by a plurality of drone devices respectively operatively coupled to processors and coordinating with one other, a defined region of a defined coordinate space of a geographic area, wherein the defined region is associated with an animal. The computer-implemented method also comprises monitoring, by the plurality of drone devices, a physical relationship between the animal and the defined region. The computer-implemented method can also comprise, in response to identifying that the physical relationship between the animal and the defined region fails to meet a criterion, performing, by the plurality of drone devices, a pattern of operations selected to alter the physical relationship between the animal and the defined region to satisfy the criterion.

20 Claims, 18 Drawing Sheets

(51) Int. Cl.
*A01K 29/00* (2006.01)
*B64C 39/02* (2006.01)
*B63G 8/00* (2006.01)
*G05D 1/10* (2006.01)
*A01K 1/00* (2006.01)

(52) U.S. Cl.
CPC .............. *A01K 57/00* (2013.01); *B63G 8/001* (2013.01); *B64C 39/024* (2013.01); *G05D 1/104* (2013.01); *B64C 2201/12* (2013.01)

(58) Field of Classification Search
CPC .................. B64C 39/02; B64C 39/024; G05D 2201/0207; G05D 1/104
USPC ................................................ 701/3, 25, 26
See application file for complete search history.

(56) References Cited

U.S. PATENT DOCUMENTS

| | | | |
|---|---|---|---|
| 6,439,162 B1 | 8/2002 | van den Berg | |
| 7,606,659 B2 * | 10/2009 | Erignac .................. | G01V 11/00 701/25 |
| 7,866,865 B2 | 1/2011 | Wu | |
| 8,229,604 B2 | 7/2012 | Villaume et al. | |
| 8,265,808 B2 | 9/2012 | Garrec et al. | |
| 8,314,695 B2 | 11/2012 | Greenberg | |
| 8,770,808 B1 | 7/2014 | Campbell et al. | |
| 8,880,241 B2 | 11/2014 | Mohamadi | |
| 8,913,783 B2 | 12/2014 | Khan et al. | |
| 9,057,609 B2 | 6/2015 | Yu et al. | |
| 9,170,117 B1 | 10/2015 | Abuelsaad et al. | |
| 9,651,945 B1 | 5/2017 | Erickson et al. | |
| 2005/0240323 A1 | 10/2005 | Orita | |
| 2006/0074557 A1 | 4/2006 | Mulligan et al. | |
| 2008/0099600 A1 | 5/2008 | Perry et al. | |
| 2010/0063650 A1 | 3/2010 | Vian et al. | |
| 2010/0180420 A1 | 7/2010 | Radgens | |
| 2011/0015816 A1 | 1/2011 | Dow et al. | |
| 2011/0208373 A1 | 8/2011 | Lees et al. | |
| 2011/0259995 A1 | 10/2011 | Frings et al. | |
| 2012/0044710 A1 | 2/2012 | Jones | |
| 2012/0081540 A1 | 4/2012 | Jang | |
| 2013/0100693 A1 | 4/2013 | Rogers | |
| 2013/0340305 A1 | 12/2013 | Mobley | |
| 2014/0249736 A1 | 9/2014 | Beda et al. | |
| 2014/0309853 A1 | 10/2014 | Ricci | |
| 2015/0127209 A1 | 5/2015 | Al-Gami et al. | |
| 2015/0251591 A1 | 9/2015 | Lu | |
| 2015/0353206 A1 | 12/2015 | Wang | |
| 2015/0370251 A1 | 12/2015 | Siegel et al. | |
| 2016/0070261 A1 | 3/2016 | Heilman et al. | |
| 2016/0071421 A1 | 3/2016 | Bousquet et al. | |
| 2016/0129999 A1 | 5/2016 | Mays | |
| 2016/0157414 A1 | 6/2016 | Ackerman et al. | |
| 2016/0264262 A1 | 9/2016 | Colin et al. | |
| 2016/0272317 A1 | 9/2016 | Cho et al. | |
| 2016/0378109 A1 * | 12/2016 | Raffa .................... | G05D 1/0038 701/2 |
| 2016/0378895 A1 | 12/2016 | Gnecco et al. | |
| 2017/0127652 A1 * | 5/2017 | Shen .................... | A01K 15/021 |
| 2017/0154524 A1 | 6/2017 | Beaulieu | |
| 2017/0199520 A1 | 7/2017 | Glatfelter | |
| 2017/0202185 A1 * | 7/2017 | Trumbull ............. | A01K 29/005 |
| 2018/0170540 A1 | 6/2018 | Claybrough | |

FOREIGN PATENT DOCUMENTS

| | | |
|---|---|---|
| CN | 103782914 A | 5/2014 |
| CN | 203689138 U | 7/2014 |
| CN | 104156821 A | 11/2014 |
| CN | 204095648 U | 1/2015 |
| CN | 105248308 A | 1/2016 |
| DE | 19900333 A1 | 7/2000 |
| FR | 3007176 A1 | 12/2014 |
| JP | 08083394 A | 3/1996 |
| KR | 1020150100589 A | 9/2015 |
| WO | 2010057266 A1 | 5/2010 |
| WO | 2014080388 A2 | 5/2014 |
| WO | 2015068864 A1 | 5/2015 |
| WO | 2015188831 A1 | 12/2015 |
| WO | WO-2015187172 A1 * 12/2015 ............ A01M 29/06 |  |
| WO | 2017153912 A1 | 9/2017 |

OTHER PUBLICATIONS

Hudson, "Drone technology makes mustering easy in North Otago video," Nov. 9, 2015, 4 pages, http://www.stuff.co.nz/business/farming/agribusiness/73454308/Drone-technology-makes-mustering-easy-in-North-Otago.

Lenkaitis, "Livestock flight zone research lays groundwork for drone use," Progressive Dairyman, Sep. 11, 2015, 5 pages, http://www.progressivedairy.com/topics/barns-equipment/livestock-flight-zone-research-lays-groundwork-for-drone-use.

U.S. Appl. No. 14/930,806, "Dynamic Management System, Method, and Recording Medium for Cognitive Drone-Swarms," filed Nov. 3, 2015, 29 pages.

Non-Final office action received for U.S. Appl. No. 15/223,358, dated Sep. 12, 2017, 24 pages.

Rear position lamps (tail lamps), from "Automotive Lighting," Last edited Jun. 7, 2016, https://en.wikipedia.org/wiki/Automotive_lighting#Rear_position_lamps .28tail_lamps.29, 1 page.

Kanistras, K. et al., "Survey of Unmanned Aerial Vehicles {UAVs) for Traffic Monitoring, Handbook of Unmanned Aerial Vehicles, 2015, pp. 2643-2666."

Jackson, M. R. C., et al., "Airborne Technology for Distributed Air Traffic Management," Proceedings of the 44th IEEE Conference on Decision and Control, and the European Control Conference, 2005, pp. 3947-3954.

Non-Final office action received for U.S. Appl. No. 14/930,806, dated Nov. 10, 2016, 24 pages.

Notice of Allowance received for U.S. Appl. No. 14/930,806, dated Jan. 18, 2017, 24 pages.

Mell, et al. "The NIST Definition of Cloud Computing". Recommendations of the National Institute of Standards and Technology, 7 pages.

Non-Final Office Action for U.S. Appl. No. 15/418,826 dated May 2, 2018, 12 pages.

Non-Final Office Action for U.S. Appl. No. 15/220,166 dated Apr. 20, 2018, 265 pages.

Humphrey, Laura R., "Model checking for Verification in UAV Cooperative Control Applications", Recent Advances in Research on Unmanned Aerial Vehicles, 2013, pp. 69-117.

Morris et al., "Self-Driving Aircraft Towing Vehicles—A Preliminary Report", Artificial Intelligence for Transportation: Advice, Interactivity and Actor Modeling: Papers from the 2015 AAAI Workshop, 2015, pp. 41-48.

Follow Me Vehicle Procedure, Retrieved from https://www.skybrary.aero/index.php/Follow_Me_Vehicle_Procedures, Retrieved on Apr. 16, 2018, 5 pages.

Office Action for U.S. Appl. No. 15/418,826 dated Jun. 29, 2018, 9 pages.

Non-Final Office Action for U.S. Appl. No. 15/994,468 dated Nov. 2, 2018, 28 pages.

Non-Final Office Action for U.S. Appl. No. 15/994,473 dated Nov. 16, 2018, 28 pages.

Non-Final Office Action for U.S. Appl. No. 15/994,478 dated Nov. 16, 2018, 32 pages.

Notice of Allowance received for U.S. Appl. No. 15/220,166, dated Sep. 21, 2018, 27 pages.

List of IBM Patents or Applications Treated as Related.

Notice of Allowance for U.S. Appl. No. 15/994,478 dated Apr. 10, 2019, 29 pages.

* cited by examiner

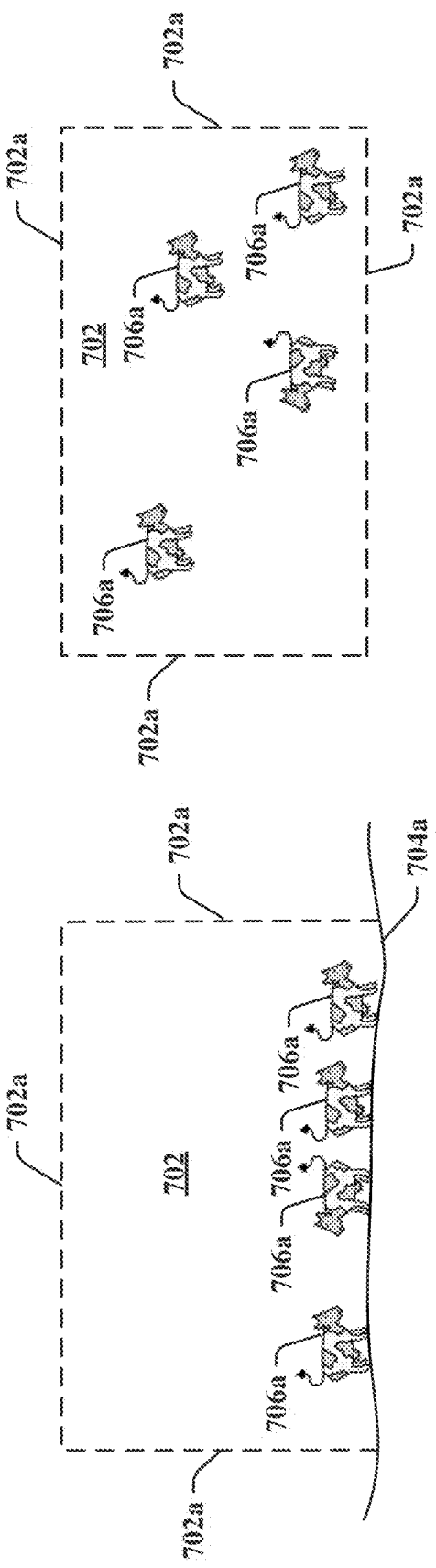
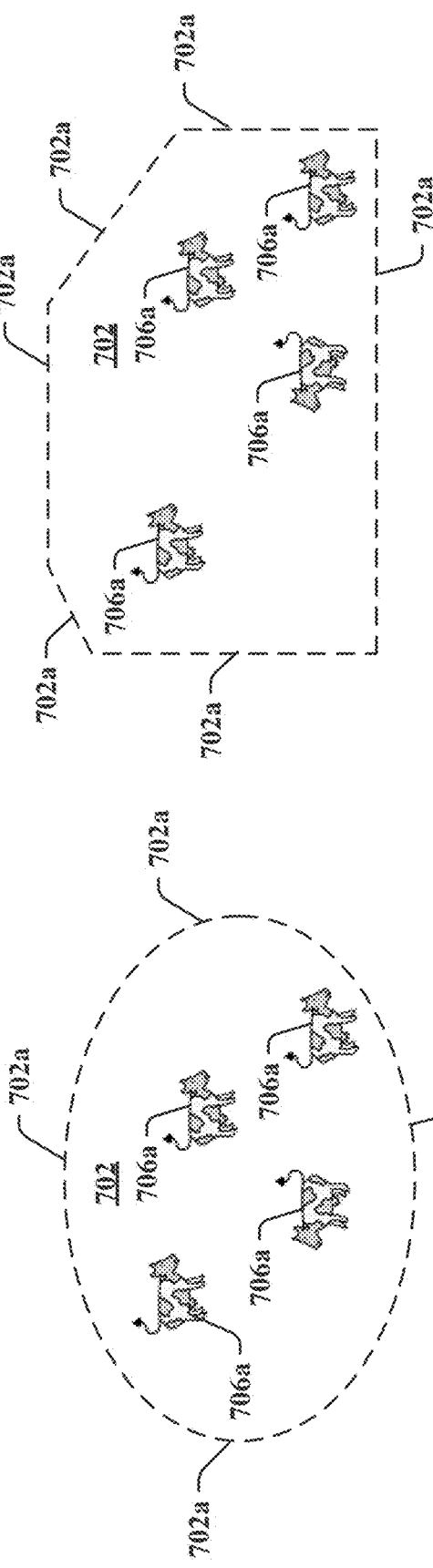
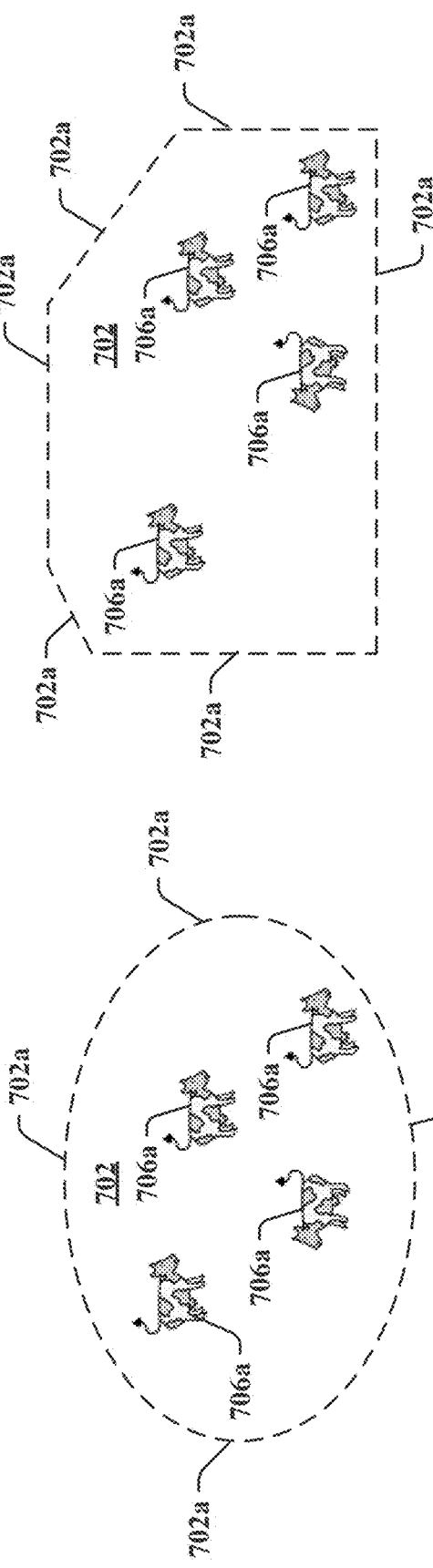
FIG. 7A
FIG. 7B
FIG. 7C
FIG. 7D

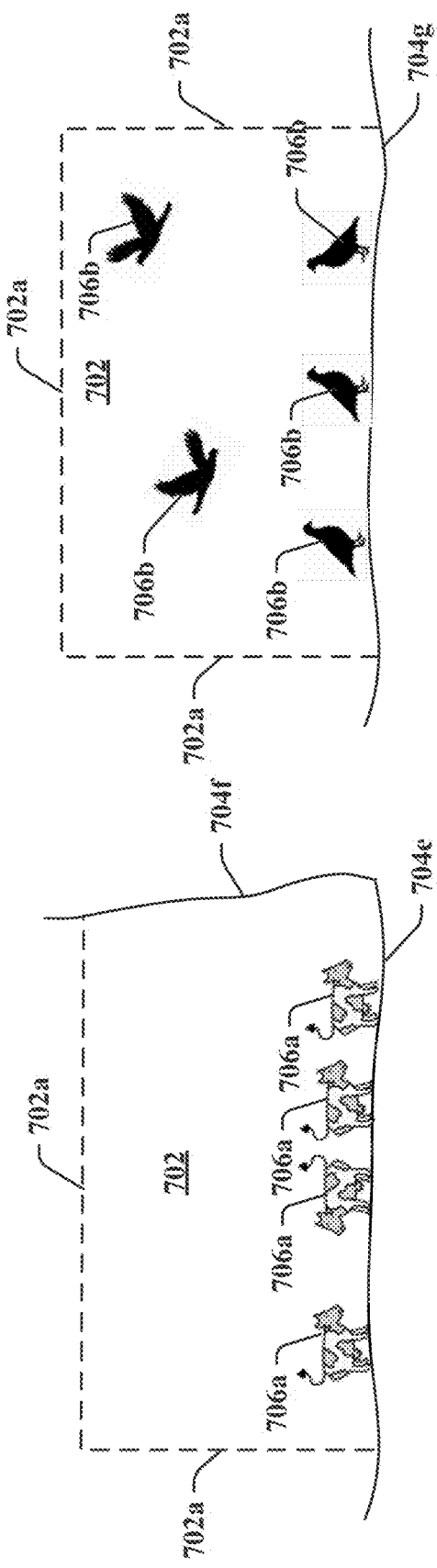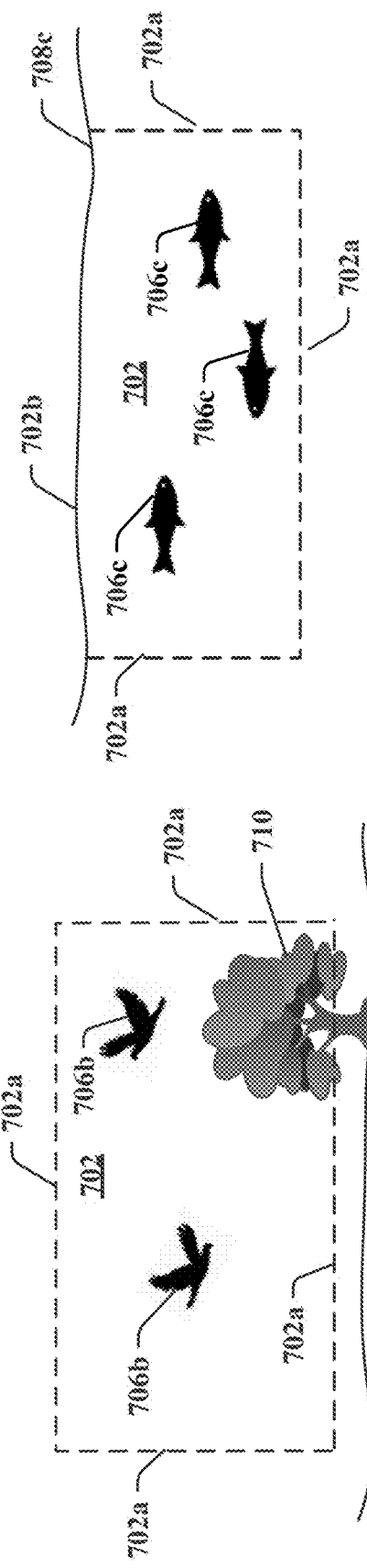
FIG. 7I
FIG. 7J
FIG. 7K
FIG. 7L

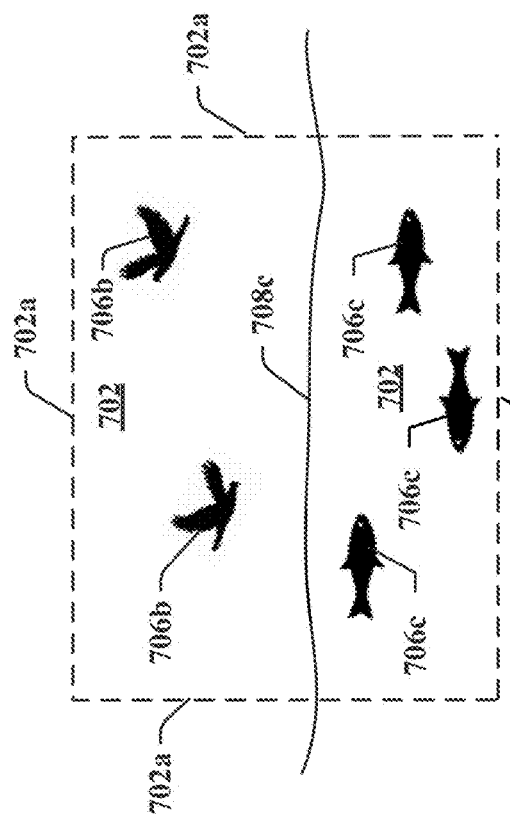
FIG. 7N
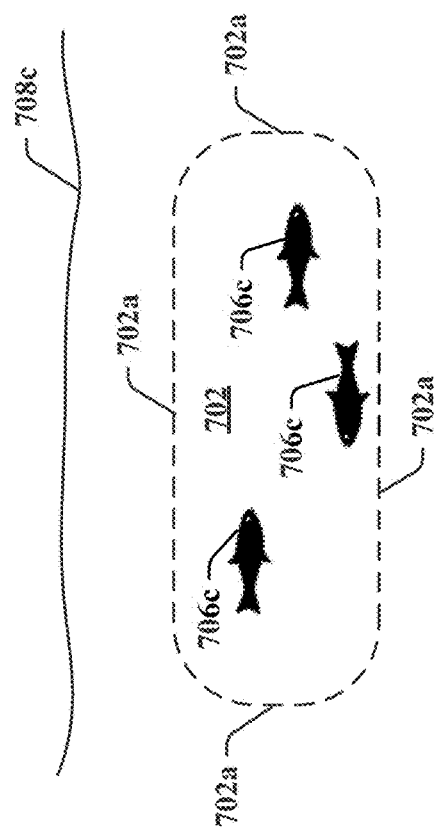
FIG. 7M
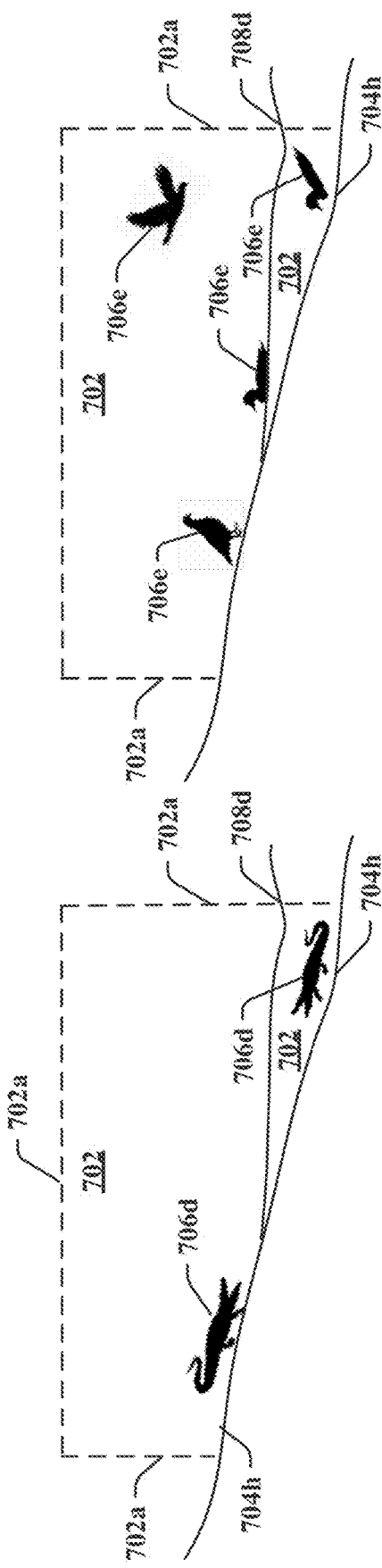
FIG. 7P
FIG. 7O

US 10,820,574 B2

SPECIALIZED CONTEXTUAL DRONES FOR VIRTUAL FENCES

BACKGROUND

The subject disclosure relates to employing drones to facilitate virtual fences and herding for animals.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate employing drones to create virtual fences for animals are described.

According to an embodiment, a computer-implemented method is provided. The computer-implemented method can comprise establishing, by a plurality of drone devices respectively operatively coupled to processors and coordinating with one other, a defined region of a defined coordinate space of a geographic area, wherein the defined region is associated with an animal. The computer-implemented method can also comprise monitoring, by the plurality of drone devices, a physical relationship between the animal and the defined region.

In another embodiment, a computer program product for managing one or more virtual boundaries of a defined region is provided. The computer program product can comprise a computer readable storage medium having program instructions embodied therewith. The program instructions can be executable by a drone device to cause the drone device to coordinate with at least one other drone device to determine the defined region of a coordinate space of a geographic area, wherein the defined region is associated with an animal; and coordinate with the at least one other drone device to monitor the one or more virtual boundaries of the defined region. The program instructions can be executable by a drone device to cause the drone device to determine a violation associated with the one or more virtual boundaries of the defined region; and coordinate with the at least one other drone device to determine one or more actions to perform by the drone device and the at least one other drone device to continue to monitor one or more virtual boundaries of the defined region and mitigate the violation associated with the one or more virtual boundaries of the defined region. The program instructions can be executable by a drone device to cause the drone device to coordinate with the at least one other drone device to perform the one or more actions.

In another embodiment, a drone device is provided. The drone device comprises a memory that stores computer executable components; and a processor that executes the computer executable components stored in the memory. The computer executable components can comprise a boundary component that determines a defined region of a coordinate space of a geographic area, wherein the defined region is associated with an animal. The computer executable components can also comprise a monitoring component that coordinates with at least one other drone device to determine whether a violation associated with a virtual boundary of the defined region has occurred. The computer executable components can also comprise a violation response component that coordinates with the at least one other drone device to determine an action to be performed by the drone device to mitigate the violation.

DETAILED DESCRIPTION

Figure 1:
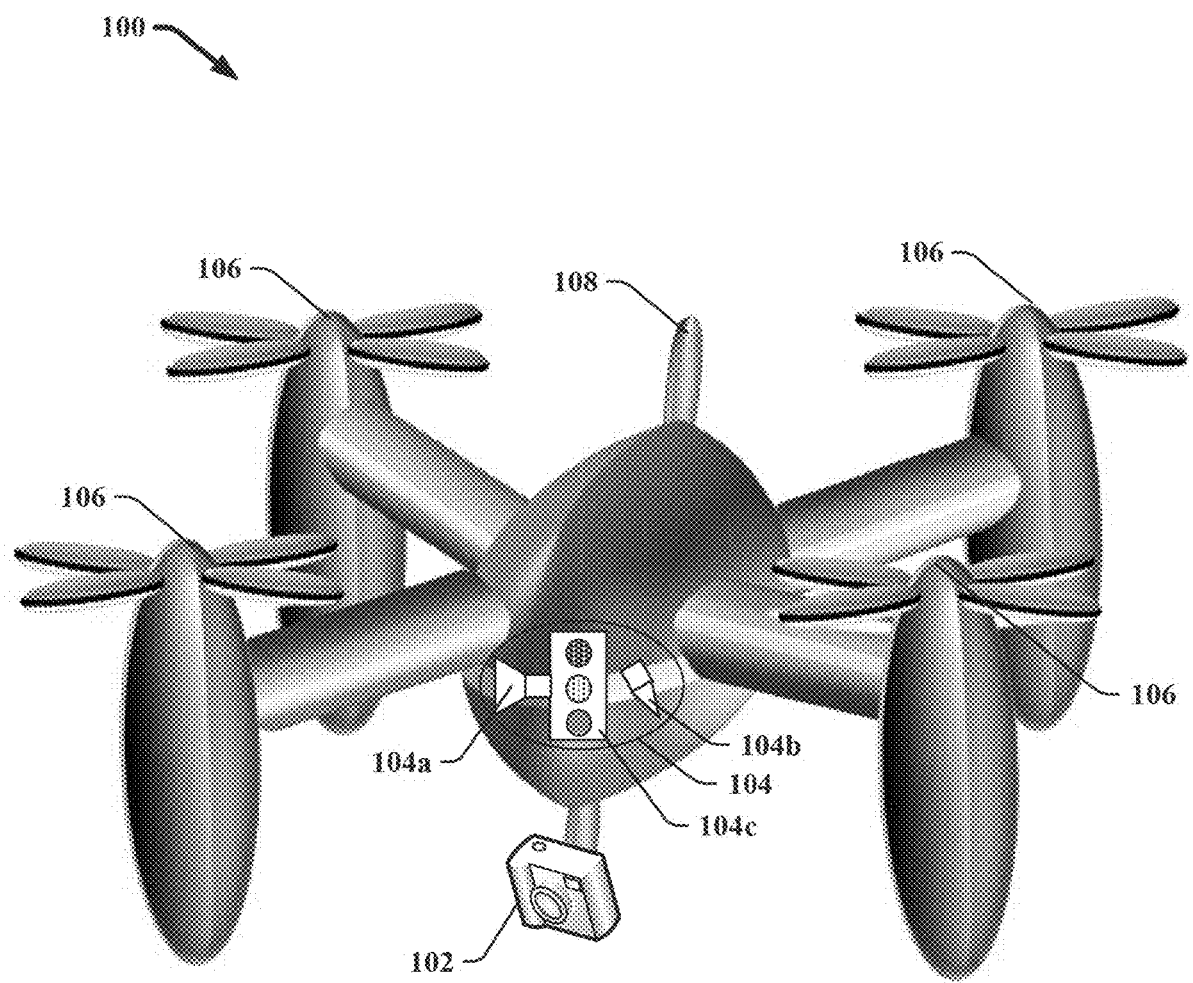
FIG. 1 illustrates a block diagram of an example, non-limiting aerial drone device in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

Businesses that involve animals generally require some type of physical fences and/or building to enclose the animals in a defined area to prevent the animals from running away and/or to protect them from predators. The physical fences and/or buildings can be a costly portion of the operation to construct and maintain. Furthermore, they are static structures that are not easily altered without significant costs. In addition, these businesses can also utilize personnel and/or trained pets to manage the animals when they are outside of their physical fences and/or buildings, such as to graze or get exercised, which can also be a significant operation expense.

FIGS. 1-4 illustrate block diagrams of example, non-limiting drone devices in accordance with one or more embodiments described herein. The subject disclosure is directed to computer processing systems, computer-implemented methods, apparatus and/or computer program products that facilitate efficiently, effectively, and automatically (e.g., with little or no direct involvement) employing drone devices to create virtual fences around a defined region of a coordinate space of a geographic area. For example, in various embodiments, a plurality of drone devices can coordinate together to create virtual fences around the defined region, maintain desired animals in the defined region, and keep undesired animals out of the defined region. It is to be appreciated that, in various embodiments, a defined region can be any suitable shape, any suitable size, any suitable location, and/or can be static or dynamically changing in size, shape, and/or location. Further, although the term "drone device" is used herein, in various embodiments, the examples provided can include one or more drone devices operating independently or in a distributed fashion, as applicable. All such embodiments are envisaged. The drone devices can monitor the defined region and areas around the defined region to detect violations related to the virtual fence around the defined region, non-limiting examples of which can include an animal that should be maintained in the defined region where the animal is approaching or has breached the virtual fence around the defined region, an animal in the defined region that should be moved outside of the virtual fence around the defined region, an animal that is outside of the virtual fence around the defined region that should be moved inside the virtual fence around the defined region, and an animal that should be kept a defined distance outside of the virtual fence around the defined region where the animal is approaching or is within the defined distance. The drone devices can take any suitable actions to correct a detected violation as discussed below.

In order to facilitate monitoring the defined region and areas around the defined region, and detecting and responding to violations, drone devices described herein can be employed that are communicating with each other, communicating with another device (e.g., an animal tag, a server device, a user equipment), communicating with animal management personnel, communicating with animal management equipment, communicating with vehicles, and/or communicating with any other suitable equipment and/or personnel. The drone devices can coordinate amongst themselves to make decisions regarding actions to be taken by the drone devices. Drone devices can receive instructions from another device, such as a control system, regarding actions to be taken by the drone devices. Drone devices can receive instructions from an operator, such as animal management personnel, regarding actions to be taken by the drone devices. A drone device can autonomously make decisions regarding actions to be taken by the drone device. It is to be appreciated that drone devices can employ any of the aforementioned decision making methods, alone or in combination, regarding actions to be taken by the drone devices.

A drone device can be, in a non-limiting example, an aerial drone device, a submersible drone device, a terrestrial drone device, a mobile robotic device (e.g., humanoid shaped, animal shaped, or any other suitable shape), or any combination thereof. A drone device can include a propulsion system appropriate for the environments in which the drone device will operate, non-limiting examples of which include one or more propellers, one or more wings, one or more motors, one or more jet engines, one or more thrusters, one or more fins, one or more wheels, one or more continuous tracks, one or more buoyancy systems, one or more transmissions, one or more drivetrains, one or more rudders, one or more trims, one or more a tails, one or more arms, one or more legs, one or more springs, one or more steering assemblies, or any other suitable propulsion components or systems.

A drone device can include a power source, non-limiting examples of which include one or more batteries, one or more fuel cells, natural gas, compressed air, diesel fuel, gasoline, oil, propane, nuclear power system, solar power system, piezoelectric power system, or any other suitable power source. A drone device can include one or more computers, one or more processors, one or more memories, and one or more programs. A drone device can communicate via any suitable form of wireless or wired communication using a communication device. Non-limiting examples of wireless communication can include radio communication, optical communication, sonic communication, electromagnetic induction communication, or any other suitable wireless communication. A drone can include one or more instruments, non-limiting examples of which include a communication device, a radio frequency identification (RFID) reader, navigation device, a sensor, a camera, a video camera, a three-dimensional camera, a global positioning system (GPS) device, a motion sensor, a radar device, a temperature sensor, a light sensor, a thermal imaging device, an infrared camera, an audio sensor, an ultrasound imaging device, a light detection and ranging (LIDAR) sensor, sound navigation and ranging (SONAR) device, a microwave sensor, a chemical sensor, a radiation sensor, an electromagnetic field sensor, a pressure sensor, a spectrum analyzer, a scent sensor, a moisture sensor, a biohazard sensor, a gyroscope, an altimeter, a microscope, magnetometer, a device capable is seeing through or inside of objects, or any other suitable instruments. In addition, instruments can include tools, non-limiting examples of which include, a projectile launcher, a liquid sprayer, an air blower, a flame thrower, a heat projector, a cold projector, a scent projector, a chemical projector, an electric discharge device, a grasping device, a moveable and/or articulating arm, a hand, object manipulation devices, a fire extinguisher, a screwdriver, a hammer, a wrench, a welder, a saw, a knife, a pick, a prod, a vacuum device, a suction device, a sander, a laser, or any suitable tools to perform any task. Additionally, instruments can include one or more indicator devices, non-limiting examples of which can include, a light, a signal light, a light pattern, a display screen, an audio speaker, or any other suitable indicator device.

A drone device can be constructed out of any suitable material appropriate for environments in which the drone device will operate. A drone device can have suitable protection against an environment in which the drone device will operate, non-limiting examples of which include weather resistant, crush resistant, fire resistant, heat resistant, cold resistant, pressure resistant, impact resistant, liquid and/or solid material ingress protection, chemical resistant, corrosion resistant, shatter resistant, scratch resistant, biocontamination resistant, electromagnetic pulse resistant, electrical shock resistant, projectile resistant, explosion resistant, or any other suitable resistance for an environment in which the drone device will operate.

FIG. 1 illustrates a block diagram of an example, non-limiting aerial drone device 100 in accordance with one or more embodiments described herein. Drone device 100 can include instrument 102, which in this example shows a camera. Drone device 100 can also include instrument 104, which in this example shows an audio speaker 104a, an air blower 104b, and lights 104c; however any suitable instruments as disclosed herein can be included in drone device 100.

Drone device 100 can include four propellers 106 in a quadcopter configuration; however, drone device 100 can include any suitable number of propellers 106 or any other suitable propulsion system. Drone device 100 can also include communication device 108. Drone device 100 can include other suitable components (not shown), such as those disclosed herein, or any other suitable components that can be implemented in a drone device.

Figure 2:
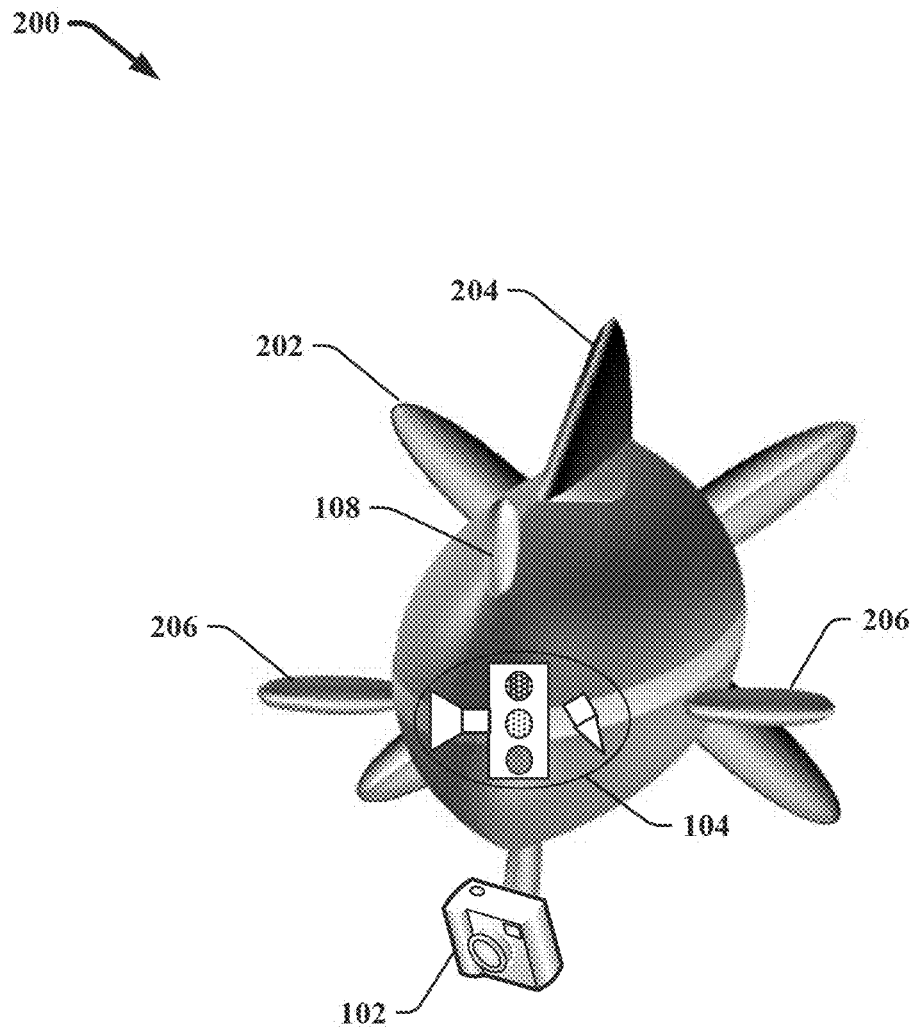
FIG. 2 illustrates a block diagram of an example, non-limiting submersible drone device in accordance with one or more embodiments described herein.

FIG. 2 illustrates a block diagram of an example, non-limiting submersible drone device 200 in accordance with one or more embodiments described herein. Repetitive description of like elements employed in other embodiments described herein is omitted for sake of brevity. Drone device 200 can include instrument 102, which in this example shows a camera; however any suitable instrument as disclosed herein can be included in drone device 200. Drone device 200 can also include instrument 104; however any suitable instruments as disclosed herein can be included in drone device 200. Drone device 200 can include a propeller 202, rudder 204, and fins 206; however, drone device 200 can include any suitable number of propellers 202, rudders 204, fins 206, or any other suitable propulsion system. Drone device 200 can also include communication device 108. Drone device 200 can include other suitable components (not shown), such as those disclosed herein, or any other suitable components that can be implemented in a drone device.

Figure 3:
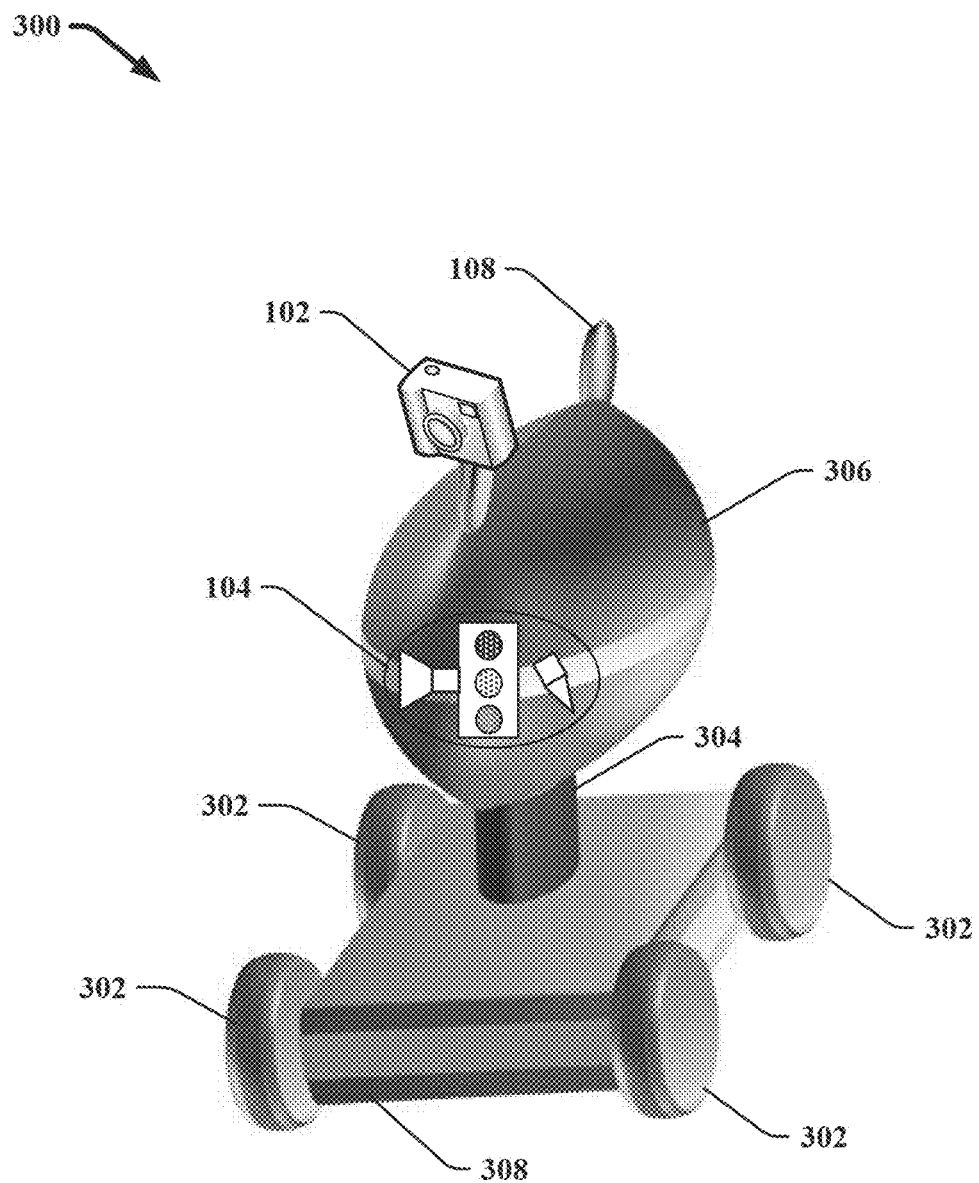
FIG. 3 illustrates a block diagram of an example, non-limiting terrestrial drone device in accordance with one or more embodiments described herein.

FIG. 3 illustrates a block diagram of an example, non-limiting terrestrial drone device 300 in accordance with one or more embodiments described herein. Repetitive description of like elements employed in other embodiments described herein is omitted for sake of brevity.

Drone device 300 can include instrument 102, which in this example shows a camera; however any suitable instrument as disclosed herein can be included in drone device 300. Drone device 300 can also include instrument 104; however any suitable instruments as disclosed herein can be included in drone device 300. While instrument 102 and instrument 104 are depicted as located on upper portion 306 of drone device 300, instrument 102 and instrument 104 can be located on lower portion 308 of drone device 300, or on both upper portion 306 and lower portion 308 of drone device 300. Drone device 300 can include four wheels 302; however drone device 300 can include any suitable number of wheels 302, or any other suitable propulsion system. In some embodiments, drone device 300 can also include communication device 108. In some embodiments, drone device 300 can also include a rotatable/extendable arm 304 that allows for instrument 102 and instrument 104 on upper portion 306 of drone device 300 to be positioned at any selected height and/or angle. Drone device 300 can include other suitable components (not shown), such as those disclosed herein, or any other suitable components that can be implemented in a drone device.

Figure 4:
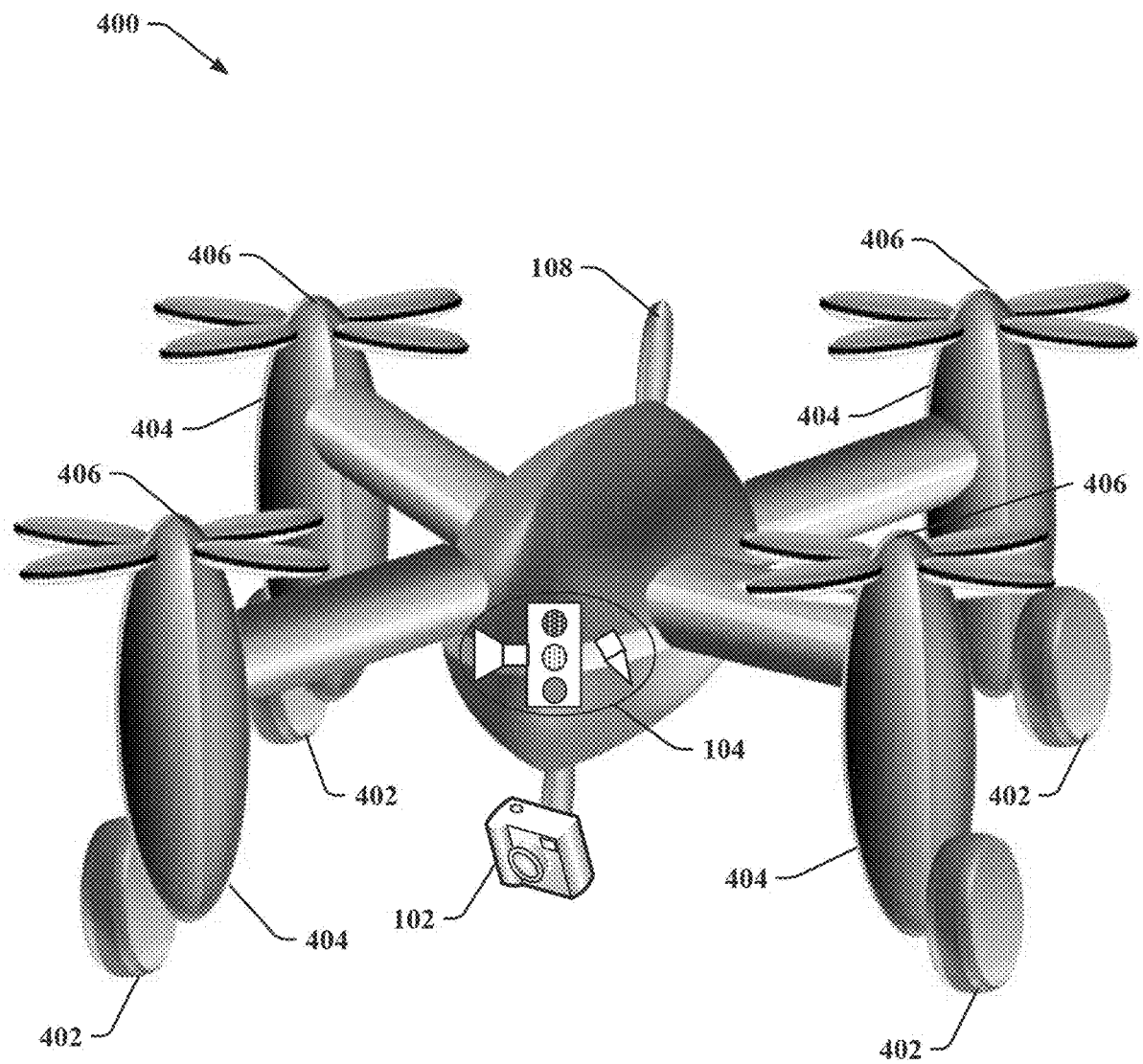
FIG. 4 illustrates a block diagram of an example, non-limiting combination aerial, submersible, and terrestrial drone device in accordance with one or more embodiments described herein.

FIG. 4 illustrates a block diagram of an example, non-limiting combination aerial, submersible, and terrestrial drone device 400 in accordance with one or more embodiments described herein. Repetitive description of like elements employed in other embodiments described herein is omitted for sake of brevity.

Drone device 400 can include instrument 102, which in this example shows a camera; however any suitable instrument as disclosed herein can be included in drone device 400. Drone device 400 can also include instrument(s) 104; however any suitable indicator device as disclosed herein can be included in drone device 400. Drone device 400 can include four propellers 406 in a quadcopter configuration; however drone device 400 can include any suitable number of propellers 106 or any other suitable propulsion system for aerial propulsion. Drone device 400 can include four wheels 402; however drone device 400 can include any suitable number of wheels 402, or any other suitable propulsion system for terrestrial propulsion. Drone device 400 can also include rotatable/movable arms 404 that allow propellers 406 to be positioned for propulsion during submersion of drone device 400; however drone device 400 can include any other suitable propulsion system for submersible propulsion. Drone device 400 can also include communication device 108. Drone device 400 can include other suitable components (not shown), such as those disclosed herein, or any other suitable components that can be implemented in a drone device.

The computer processing systems, computer-implemented methods, apparatus and/or computer program products employ hardware and/or software to solve problems that are highly technical in nature (e.g., related to complex three-dimensional coordination of a plurality of drone devices coordinating to create virtual fences around a defined region of a coordinate space and/or related to employing artificial intelligence to learn behaviors of animals and their environments) that are not abstract and that cannot be performed as a set of mental acts by a human. One or more embodiments of the subject computer processing systems, methods, apparatuses and/or computer program products enable a plurality of automated drone devices to coordinate amongst themselves, and optionally with other devices, to perform physical actions to create virtual fences around a defined region of a coordinate space of a geographic area, maintain desired animals in the defined region, and keep undesired animals out of the defined region. For example, the drone devices can employ artificial intelligence to learn behaviors of animals and their environment, the animals' reactions to various stimuli, and actions to perform to cause the animals to perform certain actions.

While some examples herein refer to cows for illustrative purposes, it is to be appreciated that the concepts disclosed herein can be employed for any type of animal (e.g., terrestrial animal, aerial animal, aquatic animal, and/or any animal that is a combination thereof) that can be enclosed in a defined region of a coordinate space of any geographic area by a virtual fence created by drone devices around the defined region. For example, a buffalo in a field can be enclosed in a defined region of the field by a virtual fence created by drone devices around the defined region. In another example, birds in a tree can be enclosed in a defined region around the tree by a virtual fence created by drone devices around the defined region. In another example, sharks in a cove can be enclosed in a defined region of the cove by a virtual fence created by drone devices around the defined region. In another example, a swarm of flying bees can be enclosed in a defined region of air by a virtual fence created by drone devices around the defined region. In another example, the swarm of flying bees can be enclosed in dynamically moving defined region of air by a virtual fence created by drone devices around the defined region, where the defined region of air is continually being changed as the swarm of bees are being guided to an area to pollenate plants. In another example, goats on a mountainside can be enclosed in defined region of the mountainside by a virtual fence created by drone devices around the defined region.

Figure 5:
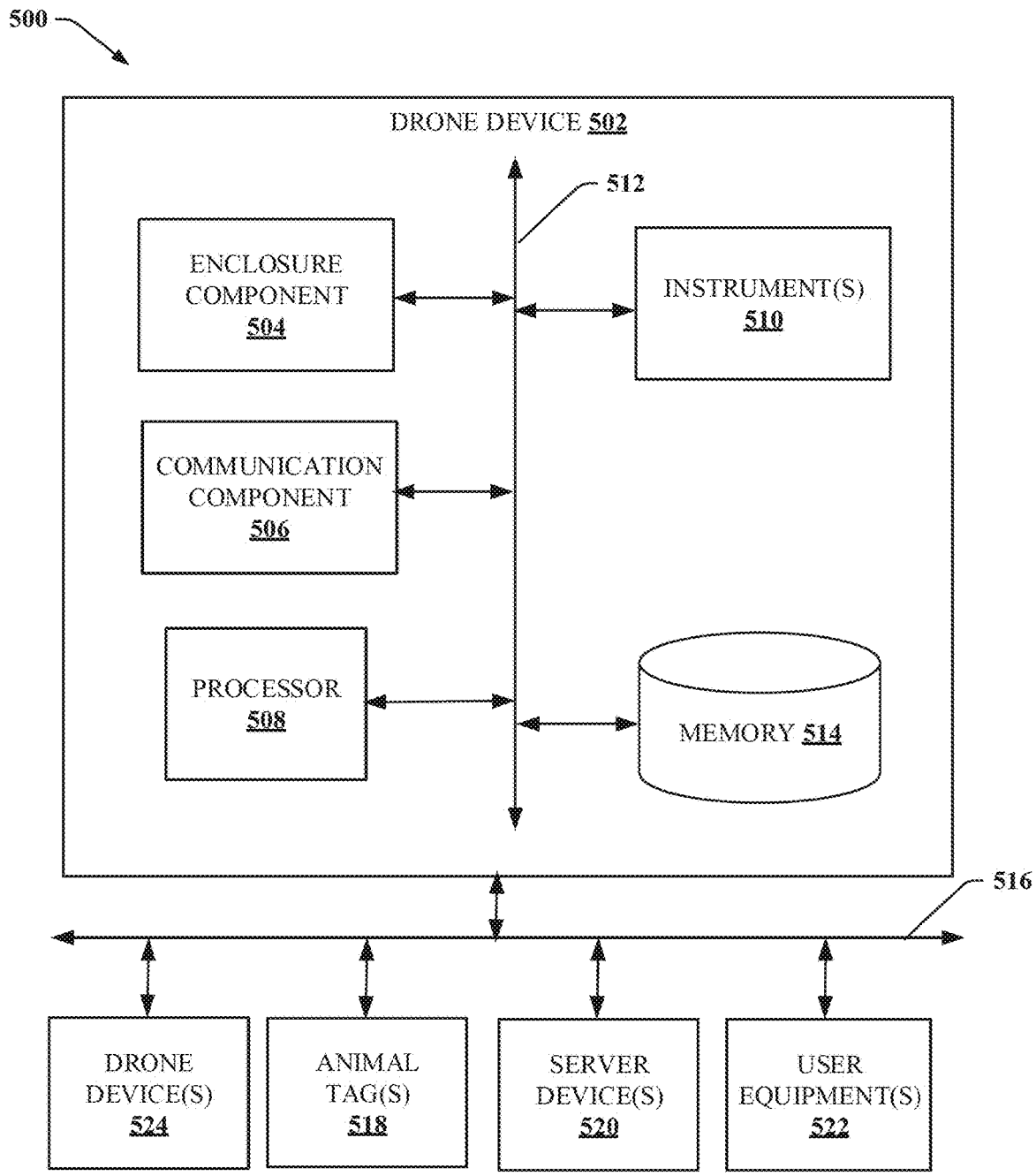
FIG. 5 illustrates a block diagram of an example, non-limiting system that facilitates a plurality of automated drone devices coordinating together to create a virtual fence around a defined region of a defined coordinate space in accordance with one or more embodiments described herein.

FIG. 5 illustrates a block diagram of an example, non-limiting system 500 that facilitates a plurality of automated drone devices coordinating together to create virtual fences around a defined region of a defined coordinate space in accordance with one or more embodiments described herein. Repetitive description of like elements employed in other embodiments described herein is omitted for sake of brevity.

In some embodiments, the system 500 facilitates a plurality of automated drone devices coordinating together to create a virtual fence around a defined region of a coordinate space of a geographic area, maintaining desired animals and objects in the defined region, and/or keeping undesired animals and/or objects out of the defined region in accordance with one or more embodiments described herein. Aspects of systems (e.g., system 500 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 5, the system 500 can include drone devices 502, 524, one or more networks 516, one or more animal tags 518, one or more server devices 520, and/or one or more user equipment 522. In various embodiments, drone devices 502, 524 can be or include the structure and/or functionality of one or more of drone device 100, 200, 300, 400 and/or any other structure and/or functionality described herein for drone devices. Drone device 524 can be a different type of drone device than drone device 502. Drone device 524 can also be a drone device 502 and/or include one or more components of drone device 502. It is to be appreciated that in disclosure herein in which more than one drone device is employed, the drone devices can include one or more drone device 502 and/or one or more drone device 524.

Drone device 502 can include instruments 510, which can include or be one or more of numerous different types of instruments disclosed herein. Drone device 502 can include communication component 506 that enables drone device 502 to communicate with other drone devices 524, animal tags 518, server devices 520, and/or user equipment 522 over one or more networks 516 via wireless and/or wired communications. Drone device 502 can include enclosure component 504 that can enable drone device 502 to coordinate together to create a virtual fence around a defined region of a coordinate space, maintaining desired animals in the defined region, and/or keeping undesired animals out of the defined region.

Drone device 502 can include or otherwise be associated with at least one memory 514 that can store computer executable components (e.g., computer executable components can include, but are not limited to, the enclosure component 504, communication component 506, and/or associated components). Drone device 502 can also include or otherwise be associated with at least one processor 508 that executes the computer executable components stored in the memory 514. Drone device 502 can further include a system bus 512 that can couple the various components including, but not limited to, enclosure component 504, communication component 506, instruments 510, memory 514, processor 508, and/or other components. While a drone device 502 is shown in FIG. 5 to include enclosure component 504, in other embodiments, any number of different types of devices can be associated with or include all or some of the components of enclosure component 504. For example, server device 520 and/or user equipment 522 can include all or some of the components of enclosure component 504. All such embodiments are envisaged.

Drone device 502 can coordinate to create a highly customizable virtual boundary (e.g., virtual fence) around a defined region of a geographic area that can take into account geographic features, including, but not limited to, landscape, water features, buildings, flora, fauna, atmosphere, urbanization, property lines, and/or any other suitable geographic features. The defined region can be any shape and any size, and/or can be customized. In some embodiments, customization can be performed in real-time.

Animal tag 518 can include any electronic or non-electronic device or mechanism that can be placed on or in an animal to track the animal. Non-limiting examples include a radio collar, a radio transponder, an RFID tag, an implantable microchip, a coded wire tag, a passive integrated transponder, an acoustic tag, an adhesive tag, a tattoo, semi-permanent paint, hair dye, a quick response code tag, a telemetry tag, a brand, a leg ring, a wing tag, an ear tag, a tail tag, a bell, and/or any other suitable electronic or non-electronic device or mechanism that can be placed on or in an animal to track the animal. Server device 520 can be any computing device that can be communicatively coupled to drone device 502, non-limiting examples of which can include a server computer, a computer, a mobile computer, a control system, an animal management system, a global positioning system (GPS), a tracking system, a weather computer, an emergency system, a communication system, a warning system, a radar system, a SONAR system, or any other suitable computing device. User equipment 522 can be any device employed by a user, non-limiting examples of which can include safety equipment, vehicles, a tracking device, a GPS device, a communication device, a server device, and/or any other suitable device that can be employed by a user. It is to be appreciated that user equipment 522 can be equipped with a communication device that enable a user and/or the user equipment 522 to communicate with drone device 502 over network 516. Furthermore, drone device 502, animal tag 518, server device 520, and/or user equipment 522 can be equipped with communication devices that enable communication between drone devices 502, 524, animal tags 518, server devices 520, and/or user equipment 522 over one or more networks 516.

The various components (e.g., enclosure component 504, communication component 506, instruments 510, memory 514, processor 508, drone devices 502, 524, animal tags 518, server devices 520, user equipment 522, and/or other components) of system 500 can be connected either directly or via one or more networks 516. Such networks 516 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, or any other suitable communication technology.

Figure 6:
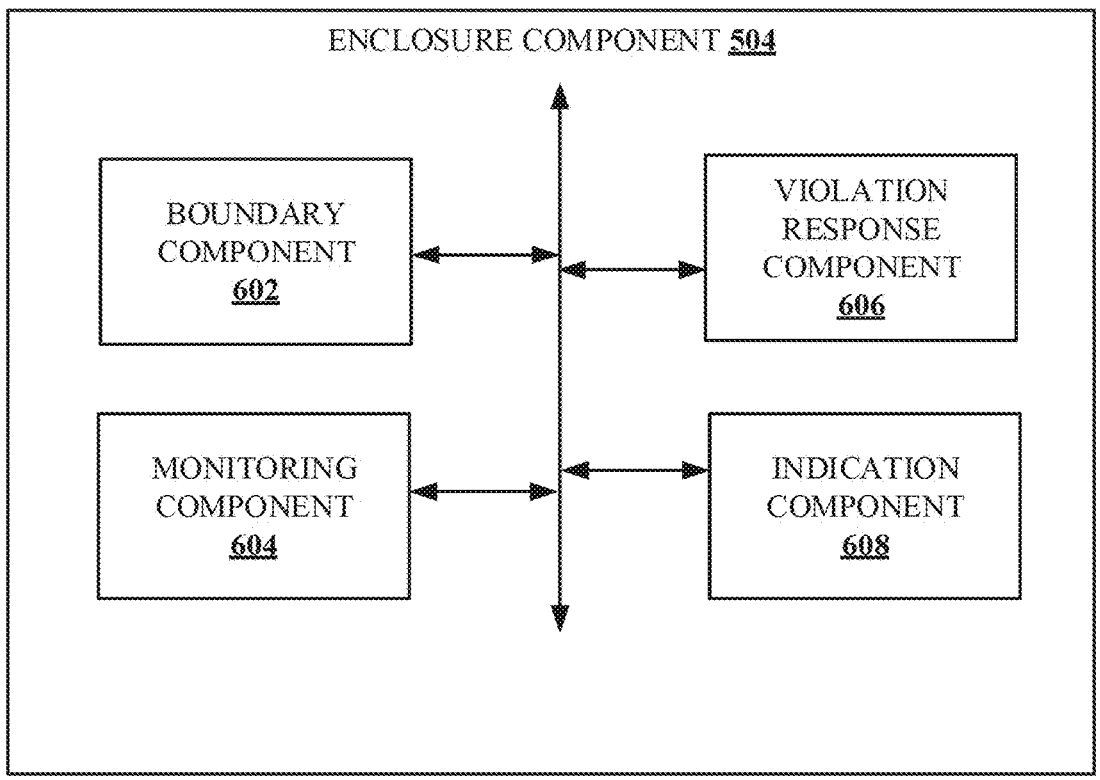
FIG. 6 illustrates a block diagram of an example, non-limiting enclosure component that can facilitate drone devices determining actions to perform to create a virtual fence around a defined region of a coordinate space in accordance with one or more embodiments described herein.

FIG. 6 illustrates a block diagram of an example, non-limiting enclosure component 504 that can facilitate drone devices 502, 524 determining actions to perform to create a virtual fence around a defined region of a coordinate space in accordance with one or more embodiments described herein. Repetitive description of like elements employed in other embodiments described herein is omitted for sake of brevity.

In some embodiments, FIG. 6 illustrates a block diagram of an example, non-limiting enclosure component 504 that can enable drone devices 502, 524 to determine (e.g., ascertain, infer, calculate, predict, prognose, estimate, derive, forecast, detect and/or compute) actions to perform to create virtual fences around a defined region of a coordinate space, maintain desired animals in the defined region, and/or keep undesired animals out of the defined region in accordance with one or more embodiments described herein.

Enclosure component 504 can include boundary component 602. In some embodiments, boundary component 602 can determine a defined region in a coordinate space of a geographic area around which to create a virtual fence. Enclosure component 504 can also include monitoring component 604 that can monitor the defined region and areas around the defined region to detect violations related to the virtual fence around the defined region. Enclosure component 504 can include violation response component 606 that can determine suitable actions for one or more drone devices 502, 524 to perform to correct a detected violation. Enclosure component 504 can also include indication component 608. In various embodiments, indication component 608 can operate one or more instruments 510 based on a determined action to be taken by drone device 502.

Boundary component 602 can determine a defined region in a coordinate space around which to create a virtual fence using self-determination (e.g., drone device 502 determines the defined region in the coordinate), by coordinating with one or more other drone devices 502, 524 and/or one or more server devices 520, and/or based on instruction from one or more server devices 520 and/or one or more user equipment 522. Using self-determination, for example, boundary component 602 can monitor information relating to region selection criteria to determine a defined region in a coordinate space around which to create a virtual fence based on defined logic and/or learned algorithms. It is to be appreciated that the region selection criteria can be pre-defined, operator specified, and/or dynamically determined, for example, based on learning algorithms.

In a non-limiting example, region selection criteria used to select the defined region from a geographic area can be based on information relating to landscape, seascape, atmosphere, flora, fauna, manmade features, objects (e.g., flora, fauna, personnel, predators, vehicles, buildings, grounds, roads, railroad tracks, water feature, rocks, trees, debris, or any other suitable object that may be in an environment in which animals are located), type of animal, type of object, animal location, object location, type of animal to be included in the defined region, animal characteristics (e.g., speed, sounds, dimensions, diet, movements, behaviors, reactions, compatible geographic features, unsafe conditions for the animal, health status, biological data, or any other suitable characteristic of an animal), number of animals to be included in the defined region, weather condition, property line boundary, predators of the type of animal, time window virtual fence is to be maintained, type of interaction between animals desired (e.g., socializing, reproducing, parenting, or any other suitable interaction between animals), type of animal activity desired (e.g., exercising, sleeping, resting, free ranging, feeding, or any other suitable type of animal activity), ground conditions, water conditions, atmospheric conditions, land topography, water currents, air currents, water salinity, air temperature, water temperature, ground temperature, ground traction, or any other suitable selection information for determining from a geographic area a defined region in a coordinate space around which to create a virtual fence.

In another example, boundary component 602 can coordinate with one or more other drone devices (e.g., drone device 524) and/or one or more server devices 520 to exchange information such that a collective decision making process can be employed by boundary component 602, one or more drone devices (e.g., drone device 524), and/or one or more server devices 520 to determine from a geographic area a defined region in a coordinate space around which to create a virtual fence. It is to be appreciated that server devices 520 can also include boundary component 602. In a non-limiting example, information exchanged can include current and/or previous defined regions, information relating to landscape, seascape, atmosphere, flora, fauna, manmade features, objects (e.g., flora, fauna, personnel, predators, vehicles, buildings, grounds, roads, railroad tracks, water feature, rocks, trees, debris, or any other suitable object that may be in an environment in which animals are located), type of animal, type of object, animal location, object location, type of animal to be included in the defined region, animal characteristics (e.g., speed, sounds, dimensions, diet, movements, behaviors, reactions, compatible geographic features, unsafe conditions for the animal, health status, biological data, or any other suitable characteristic of an animal), number of animals to be included in the defined region, weather condition, property line boundary, predators of the type of animal, time window virtual fence is to be maintained, type of interaction between animals desired (e.g., socializing, reproducing, parenting, or any other suitable interaction between animals), type of animal activity desired (e.g., exercising, sleeping, resting, free ranging, feeding, or any other suitable type of animal activity), ground conditions, water conditions, atmospheric conditions, land topography, water currents, air currents, water salinity, air temperature, water temperature, ground temperature, ground traction, or any other suitable information that can be employed by boundary component 602, drone devices 502, 524, and/or server devices 520 to determine from a geographic area a defined region in a coordinate space around which to create a virtual fence.

In another example, one or more server devices 520 (e.g., an boundary component 602 on server device 520) can employ current and/or previous defined regions, information relating to landscape, seascape, atmosphere, flora, fauna, manmade features, objects (e.g., flora, fauna, personnel, predators, vehicles, buildings, grounds, roads, railroad tracks, water feature, rocks, trees, debris, or any other suitable object that may be in an environment in which animals are located), type of animal, type of object, animal location, object location, type of animal to be included in the defined region, animal characteristics (e.g., speed, sounds, dimensions, diet, movements, behaviors, reactions, compatible geographic features, unsafe conditions for the animal, health status, biological data, or any other suitable characteristic of an animal), number of animals to be included in the defined region, weather condition, property line boundary, predators of the type of animal, time window virtual fence is to be maintained, type of interaction between animals desired (e.g., socializing, reproducing, parenting, or any other suitable interaction between animals), type of animal activity desired (e.g., exercising, sleeping, resting, free ranging, feeding, or any other suitable type of animal activity), ground conditions, water conditions, atmospheric conditions, land topography, water currents, air currents, water salinity, air temperature, water temperature, ground temperature, ground traction, or any other suitable information that can be employed by server devices 520 to determine from a geographic area a defined region in a coordinate space around which to create a virtual fence. A server device 520 can communicate instruction to drone devices 502, 524 indicating the defined region in the coordinate space around which drone devices 502, 524 are to create a virtual fence.

In another example an operator can employ a user interface (not shown) of an application on a server device 520 or a user equipment 522 to enter information specifying from a geographic area a defined region in a coordinate space around which to create a virtual fence. For example, an operator can employ an application (e.g., a mapping application, a drawing application, a GPS application, or any other suitable application) and specify coordinates on a map, use drawing tools to draw the defined region on the map, use stencil shapes to place a shape on the map to indicate the defined region, and/or use any other suitable mechanism of a user interface of any suitable application to specify from a geographic area a defined region in a coordinate space around which to create a virtual fence.

It is to be appreciated that boundary component 602 can employ artificial intelligence to make determinations regarding specification from a geographic area a defined region in a coordinate space around which to create a virtual fence using information relating to landscape, seascape, atmosphere, flora, fauna, manmade features, objects (e.g., flora, fauna, personnel, predators, vehicles, buildings, grounds, roads, railroad tracks, water feature, rocks, trees, debris, or any other suitable object that may be in an environment in which animals are located), type of animal, density of a plurality of animals in a group, type of object, animal location, object location, type of animal to be included in the defined region, animal characteristics (e.g., speed, sounds, dimensions, diet, movements, behaviors, reactions, compatible geographic features, unsafe conditions for the animal, health status, biological data, or any other suitable characteristic of an animal), number of animals to be included in the defined region, weather condition, property line boundary, predators of the type of animal, time window virtual fence is to be maintained, type of interaction between animals desired (e.g., socializing, reproducing, parenting, or any other suitable interaction between animals), type of animal activity desired (e.g., exercising, sleeping, resting, free ranging, feeding, or any other suitable type of animal activity), ground conditions, water conditions, atmospheric conditions, land topography, water currents, air currents, water salinity, air temperature, water temperature, ground temperature, ground traction, or any other suitable information that can be employed to determine from a geographic area a defined region in a coordinate space around which to create a virtual fence along with region selection criteria. In an example, boundary component 602 can determine landscape features, such as a rock face, a cliff, a waterline, a steep hillside, a wall of a building, or other obstruction that can be a suitable pre-existing boundary for a portion of a defined region in order to select the defined region. In another example, boundary component 602 can determine that the weather conditions are very sunny and select a defined region that includes shade trees for the animals. In another example, boundary component 602 can determine that the animals need to drink water, and/or select a defined region that includes a water source for the animals. In another example, boundary component 602 can determine that the animals need to feed, and/or select a defined region that includes a feed source for the animals. In another example, boundary component 602 can determine that a storm is approaching and select a defined region that is outside, but near to an enclosed structure for housing the animal in case the storm gets within an unsafe distance of the defined region.

In another example, boundary component 602 can select a defined region that minimizes potential unsafe conditions for the animals. In a further example, boundary component 602 can determine an upper boundary of the defined region based on an actual or estimated height of an animal, a maximum jumping height of an animal, and/or any other suitable criteria for determining an upper boundary of the defined region. In an additional example, boundary component can determine a space (e.g., volumetric area, a two-dimensional area, a height, a depth, a boundary, or any other suitable measurement of space) of the defined region based on a quantity of animals to be enclosed in the defined space, an actual or estimated size of the animal, a desired space between animals, a desired amount of free range area, a governmental regulation, a standards organization regulation, a property line, and/or any other suitable criteria for determining space of the defined region.

Furthermore, boundary component 602 can employ a utility (e.g., cost versus benefit) analysis in determining from a geographic area a defined region in a coordinate space around which to create a virtual fence, for example based on respective risks associated with potential violations that can occur with different possible configurations for the defined region in the geographic area. In addition, boundary component 602 can employ learning algorithms using information relating to landscape, seascape, atmosphere, flora, fauna, manmade features, objects (e.g., flora, fauna, personnel, predators, vehicles, buildings, grounds, roads, railroad tracks, water feature, rocks, trees, debris, or any other suitable object that may be in an environment in which animals are located), type of animal, density of a plurality of animals in a group, type of object, animal location, object location, type of animal to be included in the defined region, animal characteristics (e.g., speed, sounds, dimensions, diet, movements, behaviors, reactions, compatible geographic features, unsafe conditions for the animal, health status, biological data, or any other suitable characteristic of an animal), number of animals to be included in the defined region, weather condition, property line boundary, predators of the type of animal, time window virtual fence is to be maintained, type of interaction between animals desired (e.g., socializing, reproducing, parenting, or any other suitable interaction between animals), type of animal activity desired (e.g., exercising, sleeping, resting, free ranging, feeding, or any other suitable type of animal activity), ground conditions, water conditions, atmospheric conditions, land topography, water currents, air currents, water salinity, air temperature, water temperature, ground temperature, ground traction, or any other suitable information that can be employed to determine from a geographic area a defined region in a coordinate space around which to create a virtual fence that is optimized for region selection criteria. It is to be appreciated that boundary component 602 can employ any suitable learning algorithms and/or intelligent recognition techniques, any suitable information, any suitable region selection criteria, and/or any suitable function to determine from a geographic area a defined region in a coordinate space around which to create a virtual fence.

FIGS. 7A-7P illustrate block diagrams of example, non-limiting defined regions in accordance with one or more embodiments described herein. Repetitive description of like elements employed in other embodiments described herein is omitted for sake of brevity.

Figure 7E:
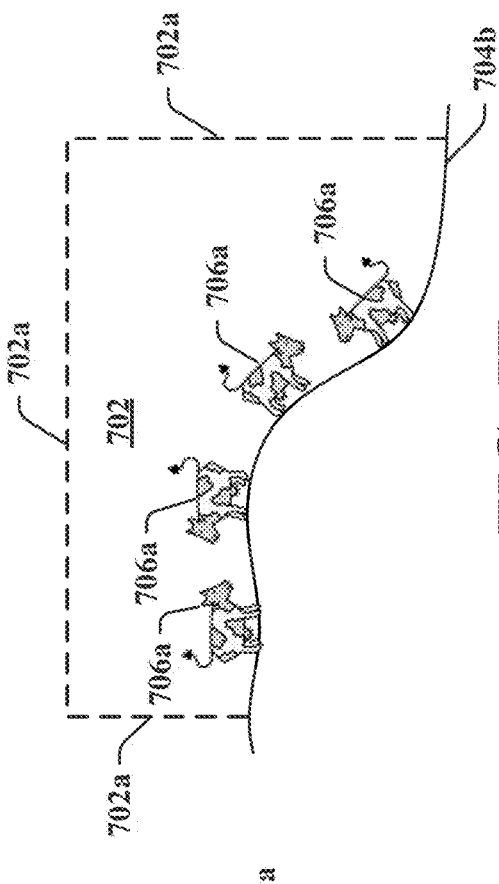
FIGS. 7A-7P illustrate block diagrams of example, non-limiting defined regions in accordance with one or more embodiments described herein.

FIG. 7A illustrates a block diagram of an example, non-limiting defined region 702 on substantially flat land 704*a* with animals 706*a* in defined region 702. Animals 706*a* are depicted as cows; however, any suitable animal can be employed. Defined region 702 is bounded on one side by land 704*a*, and bounded on other sides by virtual boundaries 702*a*. FIG. 7B illustrates a block diagram of an example, non-limiting top view of defined region 702 from FIG. 7A, where defined region 702 has a rectangular shape. FIG. 7C illustrates a block diagram of another example, non-limiting top view of defined region 702 from FIG. 7A, where defined region 702 has an elliptical shape. FIG. 7D illustrates a block diagram of another example, non-limiting top view of defined region 702 from FIG. 7A, where defined region 702 has a polygonal shape. FIG. 7E illustrates a block diagram of another example, non-limiting top view of defined region 702 from FIG. 7A, where defined region 702 has a free form shape.

Figure 7F:
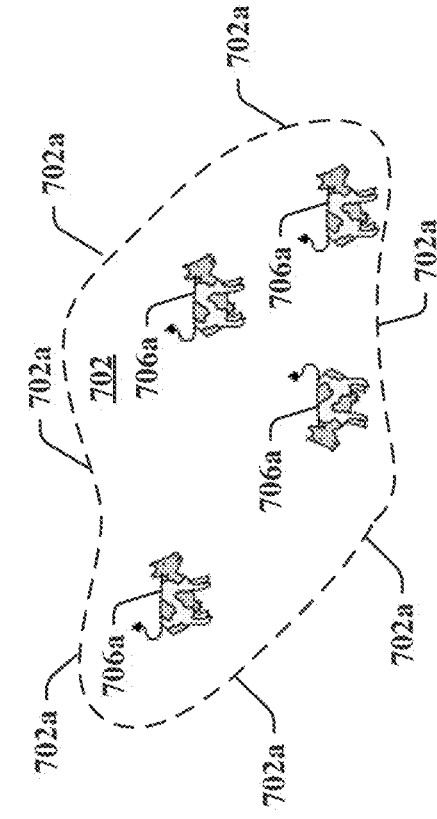
Figure 7G:
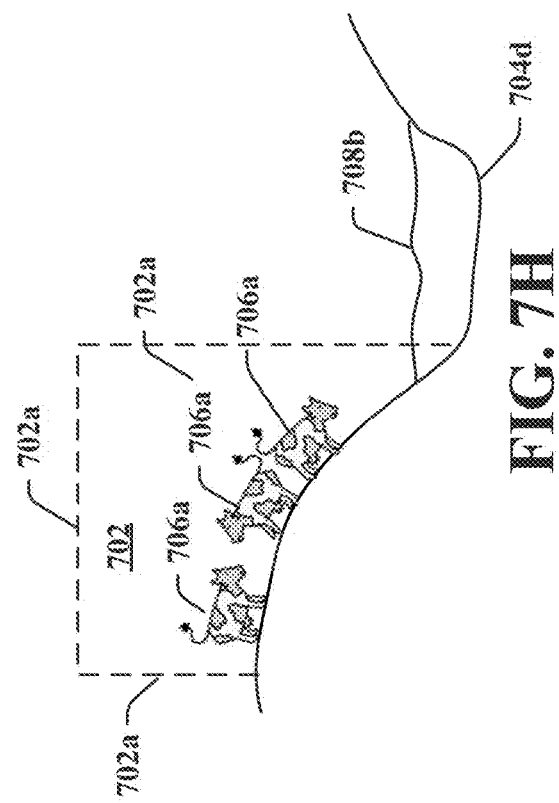

FIG. 7F illustrates a block diagram of another example, non-limiting defined region 702 on uneven land 704*b* with animals 706*a* in defined region 702. Defined region 702 is bounded on one side by land 704*b*, and/or bounded on other sides by virtual boundaries 702*a*. FIG. 7G illustrates a block diagram of another example, non-limiting defined region 702 on uneven land 704*c* with animals 706*a* in defined region 702, including a water feature (e.g., stream, pond, watering hole, or any other suitable water feature) 708*a*. In this example, animals 706*a* are capable of safely traversing water feature 708*a*, and thus water feature 708*a* is included in defined region 702. Defined region 702 is bounded on one side by land 704*c*, and bounded on other sides by virtual boundaries 702*a*.

Figure 7H:
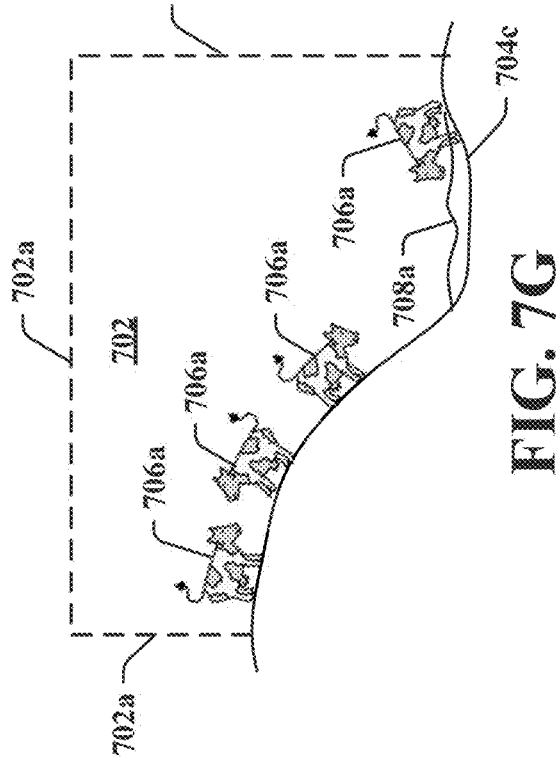

FIG. 7H illustrates a block diagram of another example, non-limiting defined region 702 on uneven land 704*d* with animals 706*a* in defined region 702, including a water feature (e.g., stream, pond, watering hole, or any other suitable water feature) 708*b*. In this example, animals 706*a* are not capable of safely traversing water feature 708*b*, and thus only a portion of water feature 708*b* is included in defined region 702 that allows for animals 706*a* to drink, but not enter water feature 708*b*. Defined region 702 is bounded on one side by land 704*d*, and/or bounded on other sides by virtual boundaries 702*a*.

FIG. 7I illustrates a block diagram of another example, non-limiting defined region 702 on substantially flat land 704*e* with animals 706*a* in defined region 702, where land 704*e* includes a rock face 704*f*. In this example, animals 706*a* are not capable of traversing beyond rock face 704*f*. Defined region 702 is bounded on one side by land 704*e*, on another side by rock face 704*f*, and/or bounded on other sides by virtual boundaries 702*a*.

FIG. 7J illustrates a block diagram of another example, non-limiting defined region 702 on substantially flat land 704*g* with animals 706*b* in defined region 702. In this example, animals 706*b* are capable of flying. Defined region 702 is bounded on one side by land 704*g*, and/or bounded on other sides by virtual boundaries 702*a*. FIG. 7K illustrates a block diagram of another example, non-limiting defined region 702 over land 704*g* with animals 706*b* in defined region 702, with a portion of tree 710 also included in the defined region. In this example, animals 706*b* are capable of flying. Defined region 702 is bounded on all sides by virtual boundaries 702*a*. In a non-limiting example, this defined region can be employed to keep birds off the ground where they may be targeted by predators, but the birds are still able to land in the portion of the tree that is safe from the predators.

FIG. 7L illustrates a block diagram of another example, non-limiting defined region 702 in water feature 708*c* with animals 706*c* in defined region 702. In this example, animals 706*c* are capable of swimming. Defined region 702 is bounded on one side using virtual boundary 702*b* that corresponds to a surface of water feature 708*c*, and bounded on all other sides underwater by virtual boundaries 702*a*. It is to be appreciated that virtual boundary 702*b* is dynamic in that it maintains correspondence with the changing surface of water feature 708*c*.

FIG. 7M illustrates a block diagram of another example, non-limiting defined region 702 in water feature 708*c* with animals 706*c* in defined region 702. Defined region 702 is bounded on all sides underwater by virtual boundaries 702*a*. In a non-limiting example, this defined region can be employed to keep fish at a depth that is safe from airborne predators.

FIG. 7N illustrates a block diagram of another example, non-limiting defined region 702 in relation to water feature 708*c* with animals 706*b* and 706*c* in defined region 702. Defined region 702 is bounded on all sides by virtual boundaries 702*a*. In this example, defined region 702 can include an area in the air and an area underwater. In a non-limiting example, this defined region can be employed to keep birds in the defined region and also keep fish that the bird feed on in the underwater area of the defined region.

FIG. 7O illustrates a block diagram of another example, non-limiting defined region 702 with animals 706*d* in defined region 702. Animal 706*d* is capable of living on land 704*h* and in water feature 708*d*. Defined region 702 is bounded on one side by land 704*h* and on all other sides by virtual boundaries 702*a*. Defined region 702 includes a portion of water feature 708d, and animals 706d can traverse over land 704h and in the portion of water feature 708d included in defined region 702.

FIG. 7P illustrates a block diagram of another example, non-limiting defined region 702 with animals 706e in defined region 702. Animal 706e is capable of living on land 704h and in water feature 708d, as well as capable of flying. Defined region 702 is bounded on one side by land 704h and on all other sides by virtual boundaries 702a. Defined region 702 includes a portion of water feature 708d, and animals 706e can traverse over land 704h, in the portion of water feature 708d included in defined region 702, and in the air in defined region 702.

Monitoring component 604 can monitor a defined region and/or areas around the defined region to determine violations related to the virtual boundaries (e.g., virtual fences) around the defined region. Monitoring component 604 can coordinate with one or more other drone devices (e.g., drone device 524) to maintain virtual boundaries around the defined region. One or more of the drones devices 502, 524 can employ instruments 510 to determine and/or communicate information to each other relating to landscape, seascape, atmosphere, flora, fauna, manmade features, objects (e.g., flora, fauna, personnel, predators, vehicles, buildings, grounds, roads, railroad tracks, water feature, rocks, trees, debris, or any other suitable object that may be in an environment in which animals are located), density of a plurality of animals in a group, type of animal, type of object, animal location, object location, type of animal to be included in the defined region, animal characteristics (e.g., speed, dimensions, sounds, shape, movements, diet, behaviors, reactions, compatible geographic features, unsafe conditions for the animal, health status, biological data, or any other suitable characteristic of an animal), number of animals to be included in the defined region, weather condition, property line boundary, predators of the type of animal, time window virtual fence is to be maintained, type of interaction between animals desired (e.g., socializing, reproducing, parenting, or any other suitable interaction between animals), type of animal activity desired (e.g., exercising, sleeping, resting, free ranging, feeding, or any other suitable type of animal activity), ground conditions, water conditions, atmospheric conditions, land topography, water currents, air currents, water salinity, air temperature, water temperature, ground temperature, ground traction, and/or any other suitable information that can be employed to maintain virtual boundaries around the defined region.

Furthermore, monitoring component 604 can coordinate with one or more other drone devices (e.g., drone device 524) using the determined and/or communicated information to determine violations related to the virtual boundaries around the defined region based on violation criteria. It is to be appreciated that the violation criteria can be pre-defined, operator specified, and/or dynamically determined, for example, based on learning algorithms. In a non-limiting example, violation criteria can include any suitable criteria related to an animal that should be maintained in the defined region where the animal is approaching or has breached the virtual boundaries around the defined region, an animal in the defined region that should be moved outside of the virtual fence around the defined region, an animal that is outside of the virtual boundaries around the defined region that should be moved inside the virtual boundaries around the defined region, an animal that should be kept a defined distance outside of the virtual boundaries around the defined region where the animal is approaching or is within the defined distance, an object in the defined region that should be located outside of the virtual boundaries around the defined region, an object that should be kept a defined distance outside of the virtual boundaries around the defined region where the object is approaching or is within the defined distance, an unsafe condition for an animal, a change in a weather condition, a change in atmospheric condition, a change in ground condition, a change in water condition, or any other suitable criteria that can be employed as a violation related to the virtual boundaries around the defined region.

Monitoring component 604 can move one or more drone devices 502, 524 to one or more positions relative to animals, objects, the defined region, an area inside the defined region, and/or an area outside of the defined region for making determinations regarding maintaining virtual boundaries around the defined region and/or violations related to the virtual boundaries around the defined region.

It is to be appreciated that monitoring component 604 can employ artificial intelligence to make determinations regarding maintaining virtual boundaries around the defined region and/or violations related to the virtual boundaries around the defined region using the determined and communicated information, or any other suitable information along with violation criteria. In addition, monitoring component 604 can employ learning algorithms using the determined and communicated information, or any other suitable information to learn models for making determinations regarding maintaining virtual boundaries around the defined region and/or violations related to the virtual boundaries around the defined region optimized for violation criteria. Monitoring component 604 can learn behaviors of animals, drone devices, and/or objects for make determinations regarding maintaining virtual boundaries around the defined region and/or violations related to the virtual boundaries around the defined region. Monitoring component 604 can employ intelligent recognition techniques (e.g., animal recognition, animal behavior recognition, animal sound recognition, scent recognition, voice recognition, audio recognition, image recognition, motion recognition, spatial relationship recognition, pattern recognition, object recognition, facial recognition, pose recognition, shape recognition, scene recognition, hue recognition, feature recognition, edge recognition, timing recognition, and/or any other suitable recognition technique) associated data captured by instruments 510 for recognizing animals, drone devices, and/or objects, learning behaviors of groups of or specific animals, drone devices, and/or objects, learning respective reactions of animals to weather conditions, land topography, aerial topography, water features, stimuli, flora, other animals, objects, humans, buildings, or any other conditions of the animal's environment, and/or for making determinations regarding maintaining virtual boundaries around the defined region and/or violations related to the virtual boundaries around the defined region. Monitoring component 604 can employ artificial intelligence using the determined and communicated information to learn patterns of drone devices 502, 524 coordinated movements that optimize maintaining virtual boundaries around the defined region by the drone devices and/or determining violations related to the virtual boundaries around the defined region by the drone devices.

Monitoring component 604 can employ artificial intelligence using the determined and/or communicated information to determine or predict a trajectory of an animal and/or object in motion in maintaining virtual boundaries around the defined region by the drone devices and/or determining violations related to the virtual boundaries around the defined region by the drone devices. Monitoring component 604 can employ artificial intelligence to learn respective distances of a drone device 502 from different types of animals that will cause an animal to react, for example such that drone device 502 can remain beyond the distance during monitoring so as to not cause animal reactions. It is to be appreciated that monitoring component 604 can employ any suitable information, any suitable violation criteria, and/or any suitable function for making determinations regarding maintaining virtual boundaries around the defined region and/or violations related to the virtual boundaries around the defined region. Monitoring component 604 can also communicate any determined information to or from an animal tag, 518, a server device 520, and/or user equipment 522. It is to be appreciated that server devices 520 can include monitoring component 604 and can provide information to drone devices 502, 524 regarding violations.

In a non-limiting example, monitoring component 604 can determine a violation that includes an animal or object that is within a defined region and is to be maintained within the defined region, where the animal or object is within a defined distance from a virtual boundary of the defined region. For example, a bird that is flying towards an upper virtual boundary of a defined region and has come within a defined distance of the upper virtual boundary can be determined by monitoring component 604 to be a violation.

In another non-limiting example, monitoring component 604 can determine a violation that includes an animal or object that is within a defined region and is to be maintained within the defined region, where the animal or object has crossed a virtual boundary of the defined region. For example, a buffalo inside a defined region that has run through a virtual boundary of a defined region can be determined by monitoring component 604 to be a violation.

In a non-limiting example, monitoring component 604 can determine a violation that includes an animal or object that is currently outside of a defined region and whose status has changed such that the animal or object is to be maintained within the defined region. For example, a fish that has swum up a stream into a lake, where the fish is a type of fish that is to be maintained in a defined region of the lake, can be given a status that indicates the fish is to maintained in a defined region of the lake, which can be registered by monitoring component 604 as a violation since the fish is currently not in the defined region.

In another non-limiting example, monitoring component 604 can determine a violation that includes an animal or object that is currently inside of a defined region and whose status has changed such that the animal or object is to be maintained outside of the defined region. For example, a tree that is within a defined region has bloomed and is going to produce dangerous berries, can be given a status that indicates the tree is to maintained outside of the defined region. In embodiments in which the tree is currently in the defined region, the tree can be registered by monitoring component 604 as a violation.

In another non-limiting example, monitoring component 604 can determine a violation that includes an animal or object that is outside of a defined region and is to be maintained outside of a defined distance of the defined region, where the animal or object is within the defined distance from a virtual boundary of the defined region. For example, a predator (e.g., predator animal, hunter, poacher) that is outside a defined region and is stalking towards a virtual boundary of a defined region, where the predator has come within a defined distance of the virtual boundary can be determined by monitoring component 604 to be a violation.

In another non-limiting example, monitoring component 604 can determine a violation that includes an animal or object that is outside of a defined region and is to be maintained outside of a defined distance of the defined region, where the animal or object has crossed a virtual boundary of the defined region. For example, a mating bull that is to be kept separated from a group of cows in a defined region, where the mating bull has run into the defined region can be determined by monitoring component 604 to be a violation. In another example, an oil drum outside of a defined region can have tipped over and oil from the drum can have spilled into the defined region, which can be determined by monitoring component 604 to be a violation.

In another non-limiting example, monitoring component 604 can determine a violation that includes a change in a condition, such as an unsafe condition for an animal, a change in a weather condition, a change in atmospheric condition, a change in ground condition, a change in water condition, or any other suitable change in a condition that meets violation criteria. For example, a rock slide can change a topography of land in a defined region to make a portion of the defined region unsafe for an animal, which can be determined by monitoring component 604 to be a violation. In another example, a lightning storm can have started near the defined region, which can be determined by monitoring component 604 to be a violation. In another example, rain can have made a water feature in a defined region too deep for the animals, which can be determined by monitoring component 604 to be a violation.

Violation response component 606 can determine one or more actions for one or more drone devices 502, 524 to perform in response to determination of a violation by monitoring component 604. In a non-limiting example, violation response component 606 can determine an action for one or more drone devices 502, 524 to perform to mitigate occurrence of a determined violation. Violation response component 606 can determine an action for one or more drone devices 502, 524 to perform based on violation mitigation criteria. It is to be appreciated that the violation mitigation criteria can be pre-defined, operator specified, and/or dynamically determined, for example, based on learning algorithms. For example, violation response component 606 can determine an action for one or more drone devices 502, 524 to perform that prevents or reduces a probability that the determined violation will actually occur. In another non-limiting example, violation response component 606 can determine an action for one or more drone devices 502, 524 to perform to mitigate an effect of a determined violation that has or will occur. For example, violation response component 606 can determine an action for one or more drone devices 502, 524 to perform that reduces or prevents an effect if the determined violation actually occurs, non-limiting example of which can include reducing animal life loss, reducing animal injury, reducing object damage, reducing cost, reducing human life loss, reducing human injury, reducing security risk, or any other effect that can result from the determined violation occurring. In a non-limiting example, actions can include producing stimuli to move animals, moving objects, communicating with personnel, adjusting the defined region, using instruments to mitigate unsafe conditions, or any other suitable action that can mitigate a determined violation.

In an example, violation response component 606 can determine one or more actions for one or more drone devices 502, 524 to perform in response to determination of a violation, wherein the action includes performing an action to mitigate occurrence of the violation. For example, if the violation is an animal that is within a defined region and is to be maintained within the defined region, where the animal is within a defined distance from a virtual boundary of the defined region, the action can include using one or more instruments 510 to produce one or more stimuli to drive the animal away defined distance from a virtual boundary of the defined region. Non-limiting examples of stimuli can include making a sound with a speaker, spraying a scent at or near the animal, providing a safe electric shock to the animal with an electric discharge device, blowing air with an air blower device at the animal, directing light to the animal using a light projection device, directing heat to the animal with a heat projection device, directing cold with a cold projection device, spraying a chemical at or near the animal, using an arm to prod the animal, move one or more drone devices 502, 524 in a pattern that cause the animal to move in a desired direction, or any other suitable an action using instruments 510 to drive the animal to move in a desired direction and/or to a desired position. It is to be appreciated that violation response component 606 can produce a combination of stimuli concurrently to instigate a desired action by an animal. Violation response component 606 can produce a single stimulus for a period of time or repeatedly over a period of time to train the animal to react to the stimulus. Furthermore, violation response component 606 can produce a single stimulus or a combination of stimuli concurrently for a period of time to train the animal to react to one stimulus with the expectation that the other stimulus is also going to be produced. For example, the combination of stimulus can include producing a sound along with blowing air with an air blower device at the animal to produce the desired result. This can be done until the animal has learned that a relation between the combination of stimuli. Then just the sound can be produced to trigger the desired action by the animal. Furthermore, violation response component 606 can determine whether the animal has learned that the relation between the combination of stimuli by producing one of the stimuli and determine whether the animal has performed the desired action. Additionally, violation response component 606 can determine whether producing one of the stimuli is no longer causing the animal to perform the desired action and re-train the animal by producing the combination of stimuli on the animal or a different combination of stimuli on the animal.

In another example, if the violation is an animal that is within a defined region and is to be maintained within the defined region, where the animal has crossed a virtual boundary of the defined region and is now outside of the defined region, the action can include using one or more instruments 510 to produce one or more stimuli to drive the animal back into the defined region.

In another example, if the violation is an animal that is currently outside of a defined region and whose status has changed such that the animal is to be maintained within the defined region, the action can include using one or more instruments 510 to produce one or more stimuli to drive the animal into the defined region.

In another example, if the violation is an animal that is currently inside of a defined region and whose status has changed such that the animal is to be maintained outside of the defined region, the action can include using one or more instruments 510 to produce one or more stimuli to drive the animal out of the defined region.

In another example, if the violation is an animal that is outside of a defined region and is to be maintained outside of a defined distance of the defined region, where the animal is within the defined distance from a virtual boundary of the defined region, the action can include using one or more instruments 510 to produce one or more stimuli to drive the animal outside of the defined distance from the virtual boundary of the defined region.

In another example, if the violation is an animal that is outside of a defined region and is to be maintained outside of a defined distance of the defined region, where the animal has crossed a virtual boundary of the defined region, the action can include using one or more instruments 510 to produce one or more stimuli to drive the animal outside of the defined distance from the virtual boundary of the defined region.

In another example, if the violation is an object that is outside of a defined region and is to be maintained outside of a defined distance of the defined region, where the object is within the defined distance from a virtual boundary of the defined region or has crossed a virtual boundary of the defined region, the action can include using one or more instruments 510 to move the object outside of the defined distance from the virtual boundary of the defined region, such as by picking up the object with a vacuum tool, moving the object with a grasping tool or one or more arms, communicating with ground personnel to move the object, or any other suitable instrument that can be used to move the object. For example, a removing a dead animal from the defined region can reduce the spread of disease. In a further example, a material that is hazardous to the animal or can cause injury to the animal can be moved outside of the defined region. In another example, the action can be to instruct boundary component to adjust the defined region to no longer have the object within the defined distance from the virtual boundary of the defined region.

In another example, if the violation is an object that is currently inside of a defined region and whose status has changed such that the object is to be maintained outside of the defined region, the action can include using one or more instruments 510 to move the object outside of the defined distance from the virtual boundary of the defined region. In another example, the action can be to instruct boundary component to adjust the defined region to no longer have the object within the defined region.

In an additional example, if the violation is an unsafe condition, the action can include using one or more instruments 510 to mitigate the unsafe condition. For example, where the unsafe condition is a fire that has started within the defined region or within an area a defined distance outside of the defined region, that action can include using one or more instruments 510 to extinguish the fire, non-limiting examples of which include using a fire extinguisher on the fire, spraying the fire with a fire suppression chemical using a chemical sprayer, spraying the fire with water using a water sprayer, communicating with a fire department, or any other suitable action to extinguish the fire. In another example, where the unsafe condition is an animal that is injured or unhealthy, the action can include splitting the defined region into two defined regions one of which includes the animal that is injured or unhealthy, move the drone devices 502, 524 and/or using instruments 510 to isolate the animal that is injured or unhealthy from other animals, using instruments 510, such as a camera, a thermal imaging device, a biosensor, a temperature sensor, a heart rate sensor, or any other suitable instrument 510, to capture data about the injured to unhealthy animal and communicate the captured data to a recipient, or any other suitable action to assist with the injured or unhealthy animal.

In another example, violation response component 606 can determine one or more actions for one or more drone devices 502, 524 to perform in response to determination of a violation, wherein the action includes providing an indication to one or more recipients, wherein the indication can include in a non-limiting example, an indication informing the one or more recipients of the violation or information related to the violation, an indication of an action the one or more recipients should perform related to mitigating the violation or an effects of the violation, an indication informing the one or more recipients of actions being performed by others related to mitigating the violation or an effects of the violation, or any other suitable indication related to the violation that can be provided to a recipient. Violation response component 606 can instruct drone device 502 to move to a location suitable for providing the indication to the one or more recipients. Violation response component 606 can instruct indication component 608 to provide an indication relating to the violation to the one or more recipients using one or more instruments 510. For example, violation response component 606 can move drone device 502 in a position visible to an animal management personnel and indication component 608 can provide a visual indication relating to the violation using a visual indicator device (e.g., a light, a signal light, a light pattern, a display screen) to the animal management personnel. In another example, violation response component 606 can move drone device 502 in a position audible to an animal management personnel and indication component 608 can provide an audible indication relating to the violation using an audio indicator device (e.g., an audio speaker) to the animal management personnel. In another example, indication component 608 can provide an electronic message transmission including an indication relating to the violation using a communication device to the recipient. In another example, indication component 608 can use a projectile launcher to launch a projectile to provide an indication relating to the violation to the recipient(s). In another example, indication component 608 can provide an electronic message transmission to the recipient including an indication relating to the violation using a communication device. In another example, violation response component 606 can cause drone device 502 to move in a pattern that provides an indication relating to the violation to the recipient.

It is to be appreciated that violation response component 606 can employ artificial intelligence to make determinations regarding actions to perform related to mitigating a violations or effects of a violation using information related to current and/or previous actions performed related to mitigating a violation or effects of a violation, captured data, information relating to landscape, seascape, atmosphere, flora, fauna, manmade features, objects (e.g., flora, fauna, personnel, predators, vehicles, buildings, grounds, roads, railroad tracks, water feature, rocks, trees, debris, or any other suitable object that may be in an environment in which animals are located), type of animal, density of a plurality of animals in a group, type of object, animal location, object location, type of animal to be included in the defined region, animal characteristics (e.g., speed, dimensions, sounds, movements, diet, behavior, reactions, compatible geographic features, unsafe conditions for the animal, health status, biological data, or any other suitable characteristic of an animal), number of animals to be included in the defined region, weather condition, property line boundary, predators of the type of animal, time window virtual fence is to be maintained, type of interaction between animals desired (e.g., socializing, reproducing, parenting, or any other suitable interaction between animals), type of animal activity desired (e.g., exercising, sleeping, resting, free ranging, feeding, or any other suitable type of animal activity), ground conditions, water conditions, atmospheric conditions, land topography, water currents, air currents, water salinity, air temperature, water temperature, ground temperature, ground traction, or any other suitable information along with any suitable violation mitigation criteria. In addition, violation response component 606 can employ learning algorithms and/or intelligent recognition techniques using information related to current and/or previous actions performed related to mitigating a violation or effects of a violation, captured data, information relating to landscape, seascape, atmosphere, flora, fauna, manmade features, objects (e.g., flora, fauna, personnel, predators, vehicles, buildings, grounds, roads, railroad tracks, water feature, rocks, trees, debris, or any other suitable object that may be in an environment in which animals are located), type of animal, density of a plurality of animals in a group, type of object, animal location, object location, type of animal to be included in the defined region, animal characteristics (e.g., speed, dimensions, sounds, diet, movements, behaviors, reactions, compatible geographic features, unsafe conditions for the animal, health status, biological data, or any other suitable characteristic of an animal), number of animals to be included in the defined region, weather condition, property line boundary, predators of the type of animal, time window virtual fence is to be maintained, type of interaction between animals desired (e.g., socializing, reproducing, parenting, or any other suitable interaction between animals), type of animal activity desired (e.g., exercising, sleeping, resting, free ranging, feeding, or any other suitable type of animal activity), ground conditions, water conditions, atmospheric conditions, land topography, water currents, air currents, water salinity, air temperature, water temperature, ground temperature, ground traction, or any other suitable information that can be employed by violation response component 606 to learn models for determining actions to perform related to mitigating a violation or effects of a violation optimized for any suitable violation mitigation criteria. Violation response component 606 can learn behaviors of animals, drone devices, and/or objects for determining actions to perform related to mitigating a violation or effects of a violation. Violation response component 606 can learn combination of stimuli that are effective in producing action by respective individual and/or types of animals to mitigate a violation or effects of a violation. Violation response component 606 can learn respective distances of a drone device 502 from different individual and/or types of animals that will cause the animals to react in various ways, for example such that drone device 502 can come within the distance to the animal to cause a specific animal reaction. It is to be appreciated that violation response component 606 can employ any suitable information, any suitable violation mitigation criteria, and/or any suitable function for determining actions to perform related to mitigating a violation or effects of a violation. It is to be appreciated that server devices 520 can include violation response component 606 and can provide information to drone devices 502, 524 regarding actions to perform related to mitigating a violation or effects of a violation.

Figure 8A:
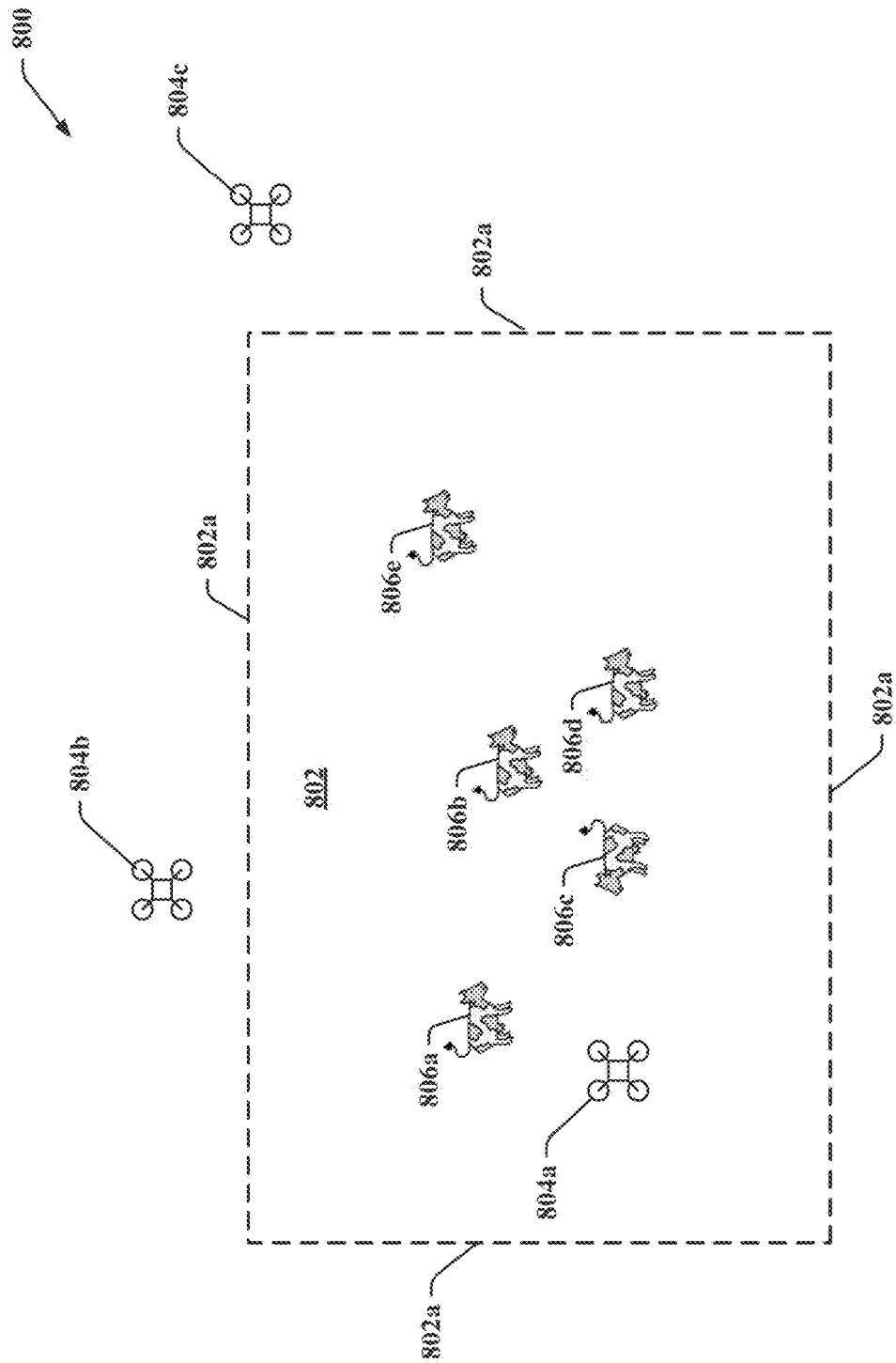
FIG. 8A illustrates a top view of a block diagram of an example, non-limiting environment with drone devices maintaining virtual boundaries around a defined region and managing violations related to the virtual boundaries around the defined region in accordance with one or more embodiments described herein.

FIG. 8A illustrates top view of a block diagram of a non-limiting example environment 800 with drone devices 804a, 804b, and 804c maintaining virtual boundaries 802a around defined region 802 and managing violations related to the virtual boundaries 802a around the defined region 802 in accordance with one or more embodiments described herein. Repetitive description of like elements employed in other embodiments described herein is omitted for sake of brevity.

Defined region 802 is bounded by land (not shown) on one side and virtual boundaries 802a on all other sides. Animals 806a-806e are located in defined region 802. While only five animals and three drone devices are depicted, it is to be appreciated that any suitable number of animals and drone devices can be included. Drone devices 804a, 804b, and/or 804c can monitor defined region 802 and areas around 802 to maintain virtual boundaries 802a and determine any violations.

Figure 8B:
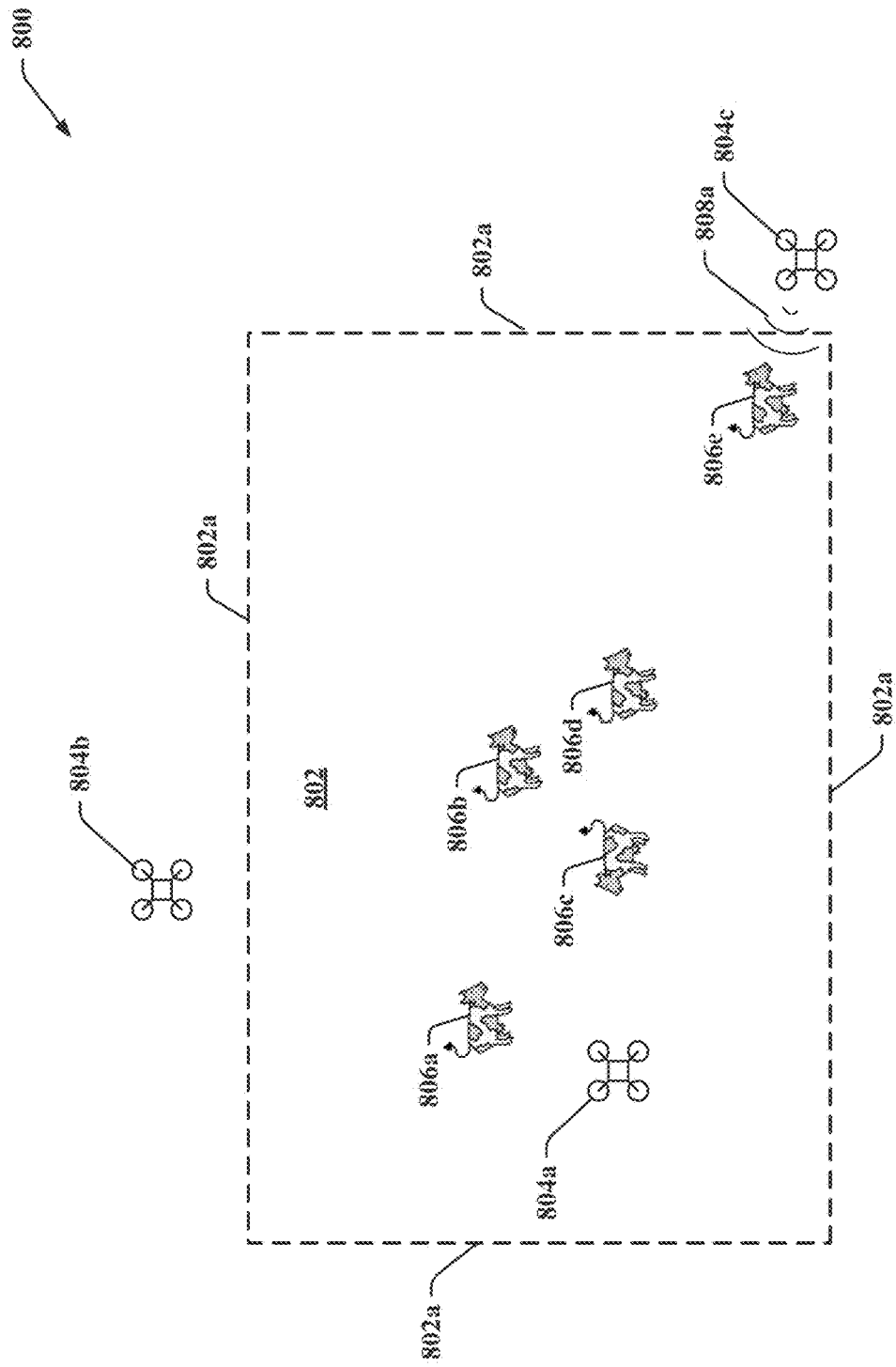
FIG. 8B illustrates a top view of a block diagram of the example, non-limiting environment, where an animal has moved within a defined distance of a virtual boundary in accordance with one or more embodiments described herein.

FIG. 8B illustrates a top view of a block diagram of the non-limiting example environment 800, where animal 806e has moved within a defined distance of virtual boundary 802a in accordance with one or more embodiments described herein. Repetitive description of like elements employed in other embodiments described herein is omitted for sake of brevity.

One or more of drone devices 804a, 804b, and/or 804c has determined a violation has occurred by animal 806e. Drone devices 804a, 804b, and/or 804c can coordinate with each other to determine actions to perform to maintain virtual boundaries 802a around defined region 802, continue to determine any other violations related to the virtual boundaries 802a around the defined region 802, and/or mitigate the violation that has occurred by animal 806e. In this example drone device 804c has been deployed to mitigate the violation that has occurred by animal 806e by producing one or more stimuli 808a to drive animal 806e away from the defined distance of virtual boundary 802a, while drone devices 804a and 804b maintain virtual boundaries 802a around defined region 802 and continue to determine any other violations related to the virtual boundaries 802a around the defined region 802. It is to be appreciated that drone device 804c can also maintain virtual boundaries 802a around defined region 802 and continue to determine any other violations related to the virtual boundaries 802a around the defined region 802, while producing the one or more stimuli 808a to drive animal 806e away from the defined distance of virtual boundary 802a.

Figure 8C:
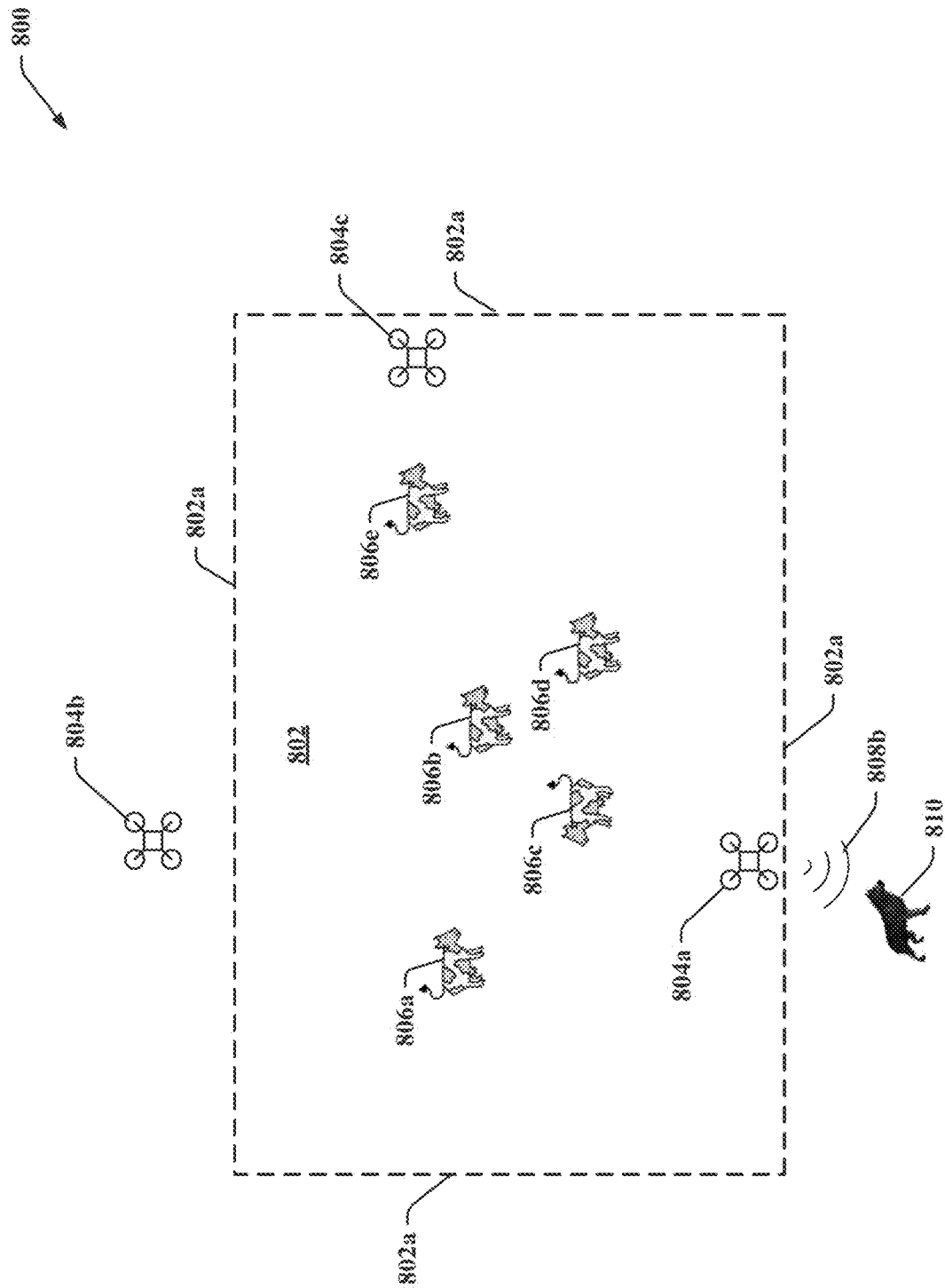
FIG. 8C illustrates a top view of a block diagram of the example, non-limiting environment, where a predator animal has moved within a defined distance outside of a virtual boundary in accordance with one or more embodiments described herein.

FIG. 8C illustrates a top view of a block diagram of the non-limiting example environment 800, where a predator animal 810 has moved within a defined distance outside of virtual boundary 802a in accordance with one or more embodiments described herein. Repetitive description of like elements employed in other embodiments described herein is omitted for sake of brevity.

One or more of drone devices 804a, 804b, and/or 804c has determined a violation has occurred by predator animal 810. Drone devices 804a, 804b, and/or 804c can coordinate with each other to determine actions to perform to maintain virtual boundaries 802a around defined region 802, continue to determine any other violations related to the virtual boundaries 802a around the defined region 802, and/or mitigate the violation that has occurred by predator animal 810. In this example drone device 804a has been deployed to mitigate the violation that has occurred by predator animal 810 by producing one or more stimuli 808b to drive predator animal 810 away from the defined distance of virtual boundary 802a, while drone devices 804b and 804c maintain virtual boundaries 802a around defined region 802 and continue to determine any other violations related to the virtual boundaries 802a around the defined region 802. It is to be appreciated that drone device 804a can also maintain virtual boundaries 802a around defined region 802 and continue to determine any other violations related to the virtual boundaries 802a around the defined region 802, while producing the one or more stimuli 808b to drive predator animal 810 away from the defined distance of virtual boundary 802a. It is to be appreciated that multiple drone devices 804a, 804b, and/or 804c can be employed to drive predator animal 810 outside of the defined distance of virtual boundary 802a.

While FIGS. 5 and 6 depict separate components in drone device 502, it is to be appreciated that two or more components can be implemented in a common component. Further, it is to be appreciated that the design of the drone device 502 can include other component selections, component placements, etc., to facilitate maintaining virtual boundaries around a defined region and managing violations related to the virtual boundaries around the defined region in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to maintaining virtual boundaries around a defined region and managing violations related to the virtual boundaries around the defined region. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems for maintaining virtual boundaries around a defined region and managing violations related to the virtual boundaries around the defined region by improving processing efficiency among processing components in these systems, reducing delay in processing performed by the processing components, and/or improving the accuracy in which the processing systems maintain virtual boundaries around a defined region and managing violations related to the virtual boundaries around the defined region.

It is to be appreciated that the any criteria (e.g., region selection criteria, violation criteria, violation mitigation criteria, or any other suitable criteria) disclosed herein can be pre-defined, operator specified, and/or dynamically determined, for example, based on learning algorithms.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 9:
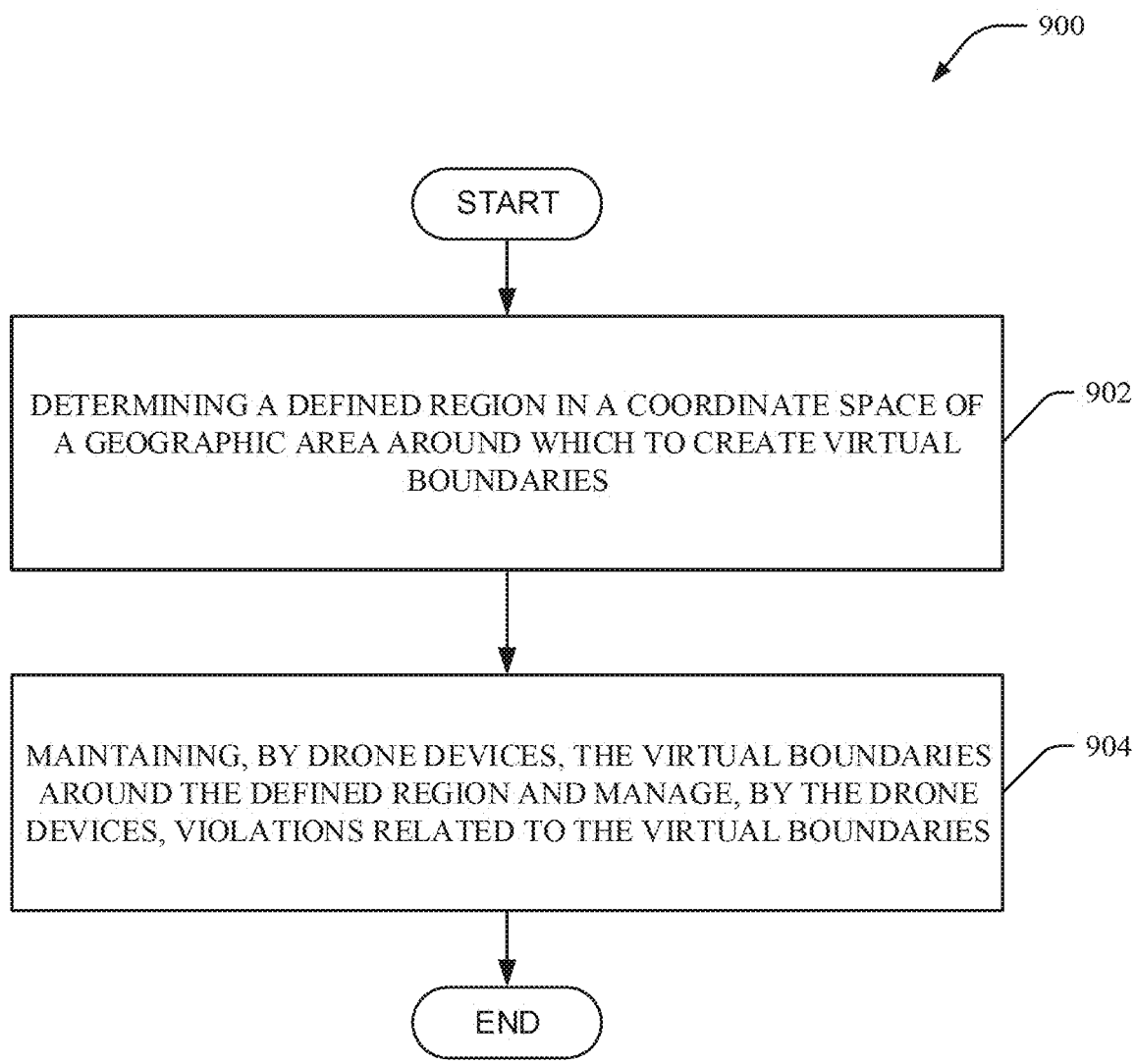
FIG. 9 illustrates a flow diagram of an example, non-limiting computer-implemented method that facilitates drone devices maintaining virtual boundaries around a defined region and managing violations related to the virtual boundaries around the defined region in accordance with one or more embodiments described herein.

FIG. 9 illustrates a flow diagram of an example, non-limiting computer-implemented method 900 that facilitates drone devices maintaining virtual boundaries around a defined region and managing violations related to the virtual boundaries around the defined region in accordance with one or more embodiments described herein. Repetitive description of like elements employed in other embodiments described herein is omitted for sake of brevity.

At 902, drone devices can determine a defined region in a coordinate space of a geographic area around which to create virtual boundaries (e.g., via drone devices 502, 524, server device 520, user equipment 522, enclosure component 504, and/or boundary component 602). At 904, the drone devices can maintain the virtual boundaries around the defined region and manage violations related to the virtual boundaries (e.g., via drone devices 502, 524 enclosure component 504, boundary component 602, monitoring component 604, violation response component 606, and/or indication component 608).

Figure 10:
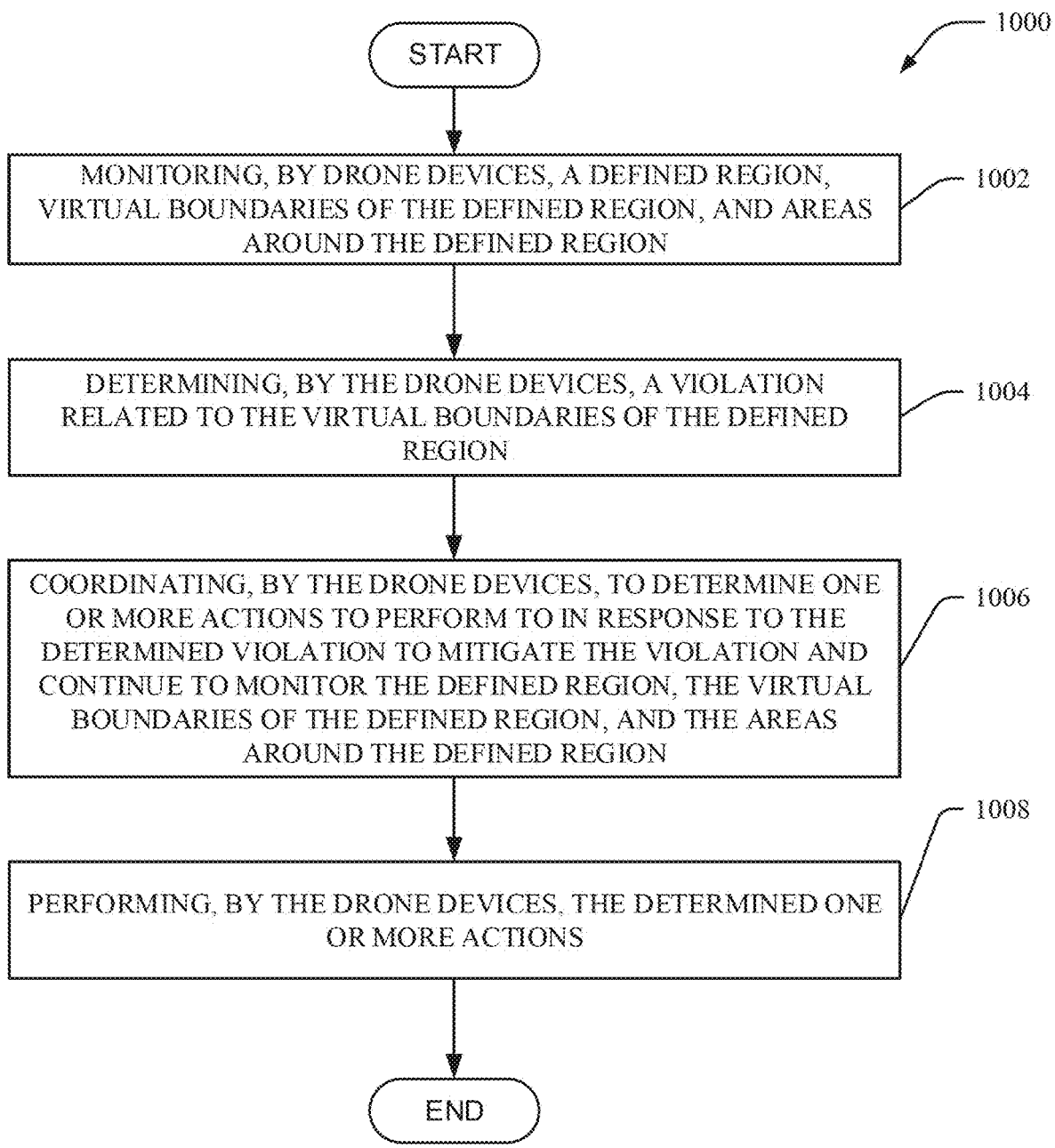
FIG. 10 illustrates a flow diagram of an example, non-limiting computer-implemented method that facilitates drone devices maintaining virtual boundaries around a defined region and managing violations related to the virtual boundaries around the defined region in accordance with one or more embodiments described herein.

FIG. 10 illustrates a flow diagram of an example, non-limiting computer-implemented method 1000 that facilitates drone devices maintaining virtual boundaries around a defined region and managing violations related to the virtual boundaries around the defined region in accordance with one or more embodiments described herein. Repetitive description of like elements employed in other embodiments described herein is omitted for sake of brevity.

At 1002, drone devices can monitor a defined region, virtual boundaries of the defined region, and/or areas around the defined region (e.g., via drone devices 502, 524, server device 520, enclosure component 504, and/or monitoring component 604). At 1004, the drone devices can determine a violation related to the virtual boundaries of the defined region (e.g., via drone device 502, server device 520, enclosure component 504, and/or monitoring component 604). At 1006, the drone devices can coordinate to determine one or more actions to perform in response to the determined violation to mitigate the violation and continue to monitor the defined region, the virtual boundaries of the defined region, and/or the areas around the defined region (e.g., via drone device 502, server device 520, enclosure component 504, violation response component 606). At 1008, the drone devices can perform the determined one or more actions (e.g., via drone device 502, server device 520, enclosure component 504, boundary component 602, monitoring component 604, violation response component 606, and/or indication component 608).

Figure 11:
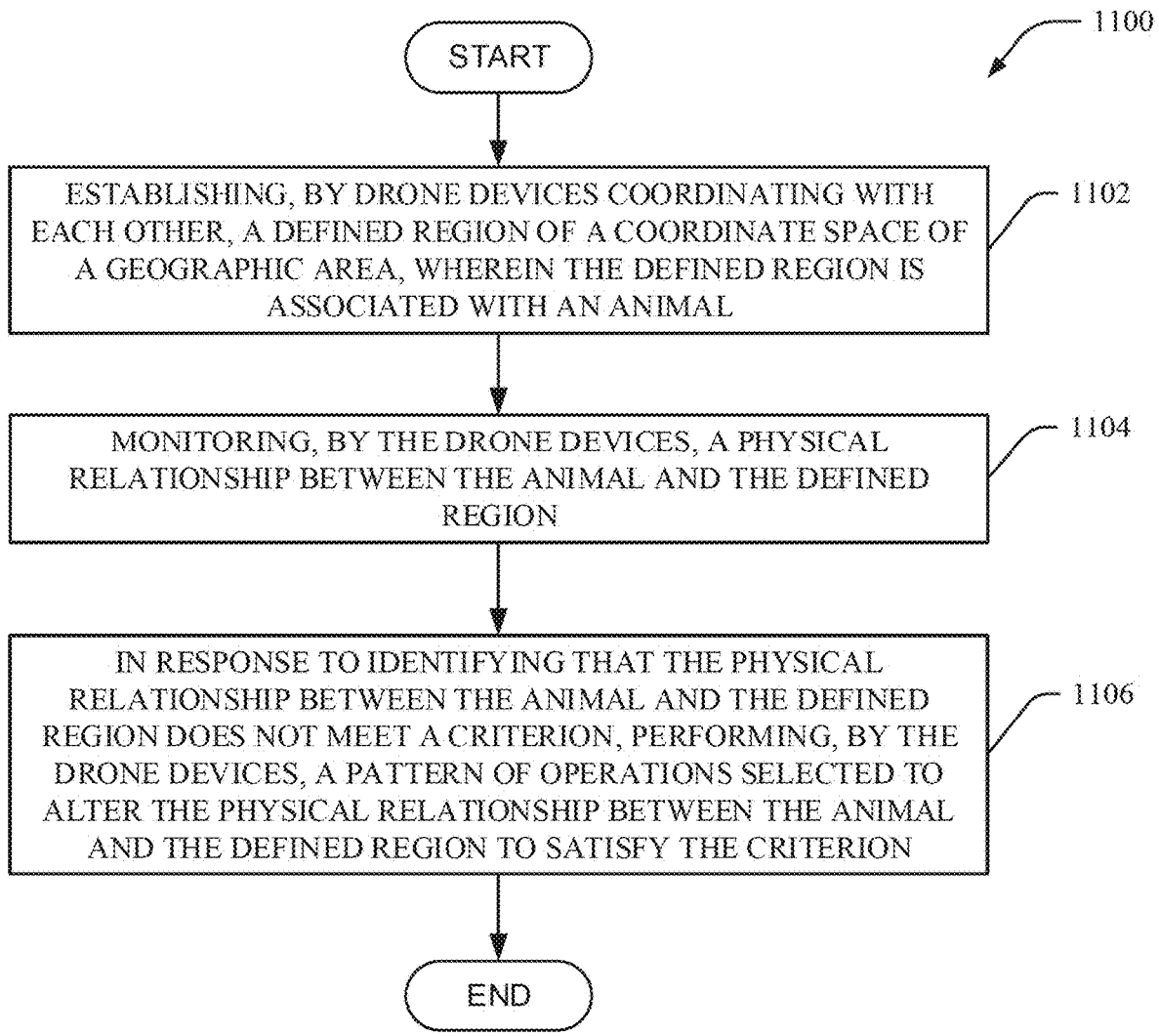
FIG. 11 illustrates a flow diagram of an example, non-limiting computer-implemented method that facilitates drone devices establishing a defined region associated with an animal in accordance with one or more embodiments described herein.

FIG. 11 illustrates a flow diagram of an example, non-limiting computer-implemented method 1100 that facilitates drone devices establishing a defined region associated with an animal in accordance with one or more embodiments described herein. Repetitive description of like elements employed in other embodiments described herein is omitted for sake of brevity.

At 1102, drone devices can coordinate with each other to establish a defined region of a coordinate space of a geographic area, wherein the defined region is associated with an animal (e.g., via drone devices 502, 524, server device 520, enclosure component 504, and/or boundary component 602). At 1104, the drone devices can monitor a physical relationship between the animal and the defined region (e.g., via drone device 502, server device 520, enclosure component 504, and/or monitoring component 604). At 1106, in response to identifying that the physical relationship between the animal and the defined region does not meet a criterion, the drone devices can perform a pattern of operations selected to alter the physical relationship between the animal and the defined region to satisfy the criterion (e.g., via drone device 502, server device 520, enclosure component 504, boundary component 602, monitoring component 604, violation response component 606, and/or indication component 608).

Figure 12:
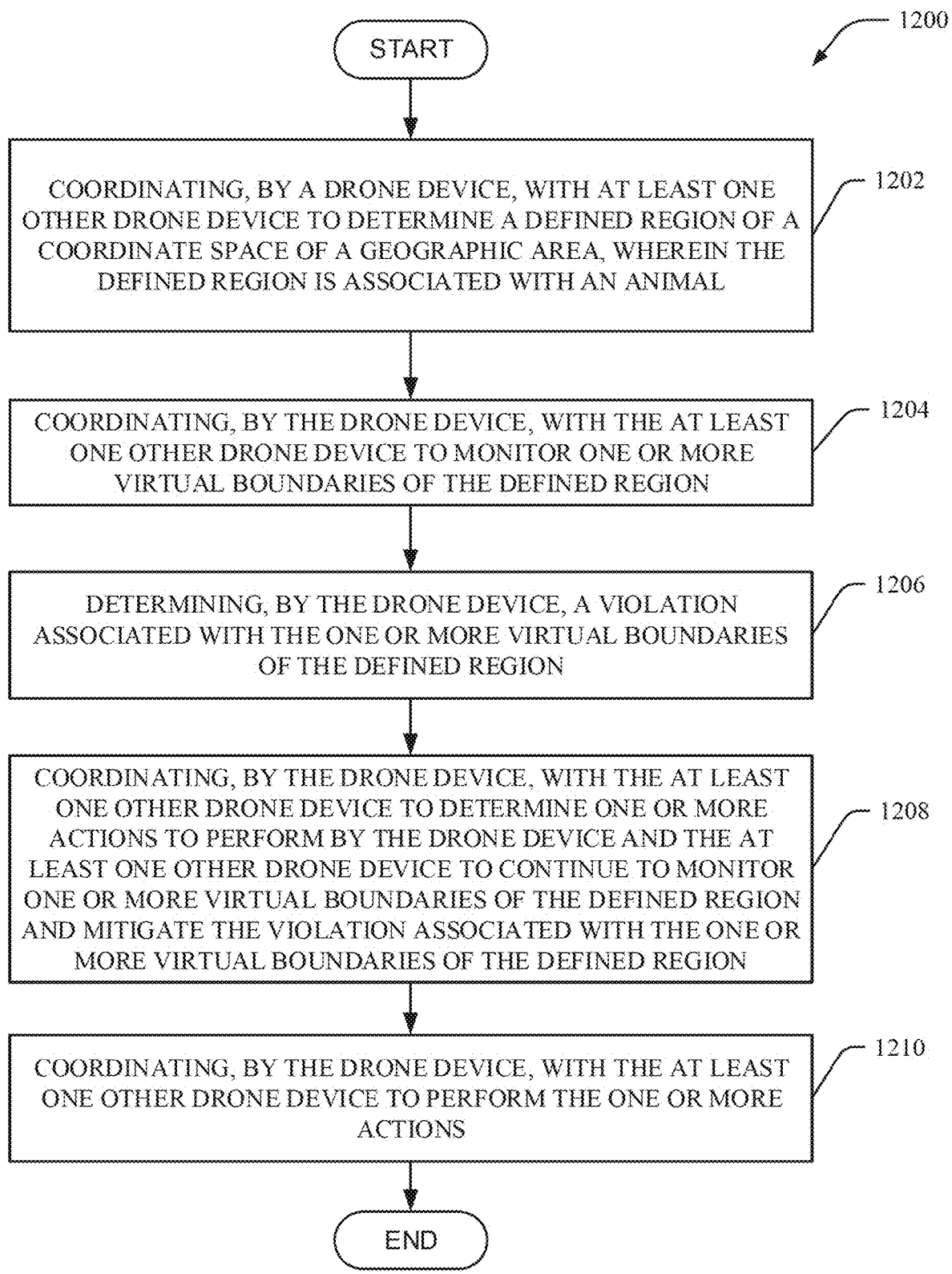
FIG. 12 illustrates a flow diagram of an example, non-limiting computer-implemented method that facilitates drone devices managing violations associated with a defined region associated with an animal in accordance with one or more embodiments described herein.

FIG. 12 illustrates a flow diagram of an example, non-limiting computer-implemented method 1200 that facilitates drone devices managing violations associated with a defined region associated with an animal in accordance with one or more embodiments described herein. Repetitive description of like elements employed in other embodiments described herein is omitted for sake of brevity.

At 1202, a drone device can coordinate with at least one other drone device to determine a defined region of a coordinate space of a geographic area, wherein the defined region is associated with an animal (e.g., via drone device 502, server device 520, enclosure component 504, and/or boundary component 602). At 1204, the drone device can coordinate with the at least one other drone device to monitor one or more virtual boundaries of the defined region (e.g., via drone device 502, server device 520, enclosure component 504, and/or monitoring component 604).

At 1206, the drone device can determine a violation associated with the one or more virtual boundaries of the defined region (e.g., via drone device 502, server device 520, enclosure component 504, and/or monitoring component 604). At 1208, the drone device can coordinate with the at least one other drone device to determine one or more actions to perform by the drone device and the at least one other drone device to continue to monitor one or more virtual boundaries of the defined region and mitigate the violation associated with the one or more virtual boundaries of the defined region (e.g., via drone device 502, server device 520, enclosure component 504, boundary component 602, monitoring component 604, violation response component 606, and/or indication component 608). At 1210, the drone device can coordinate with the at least one other drone device to perform the one or more actions (e.g., via drone device 502, server device 520, enclosure component 504, boundary component 602, monitoring component 604, violation response component 606, and/or indication component 608).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 13:
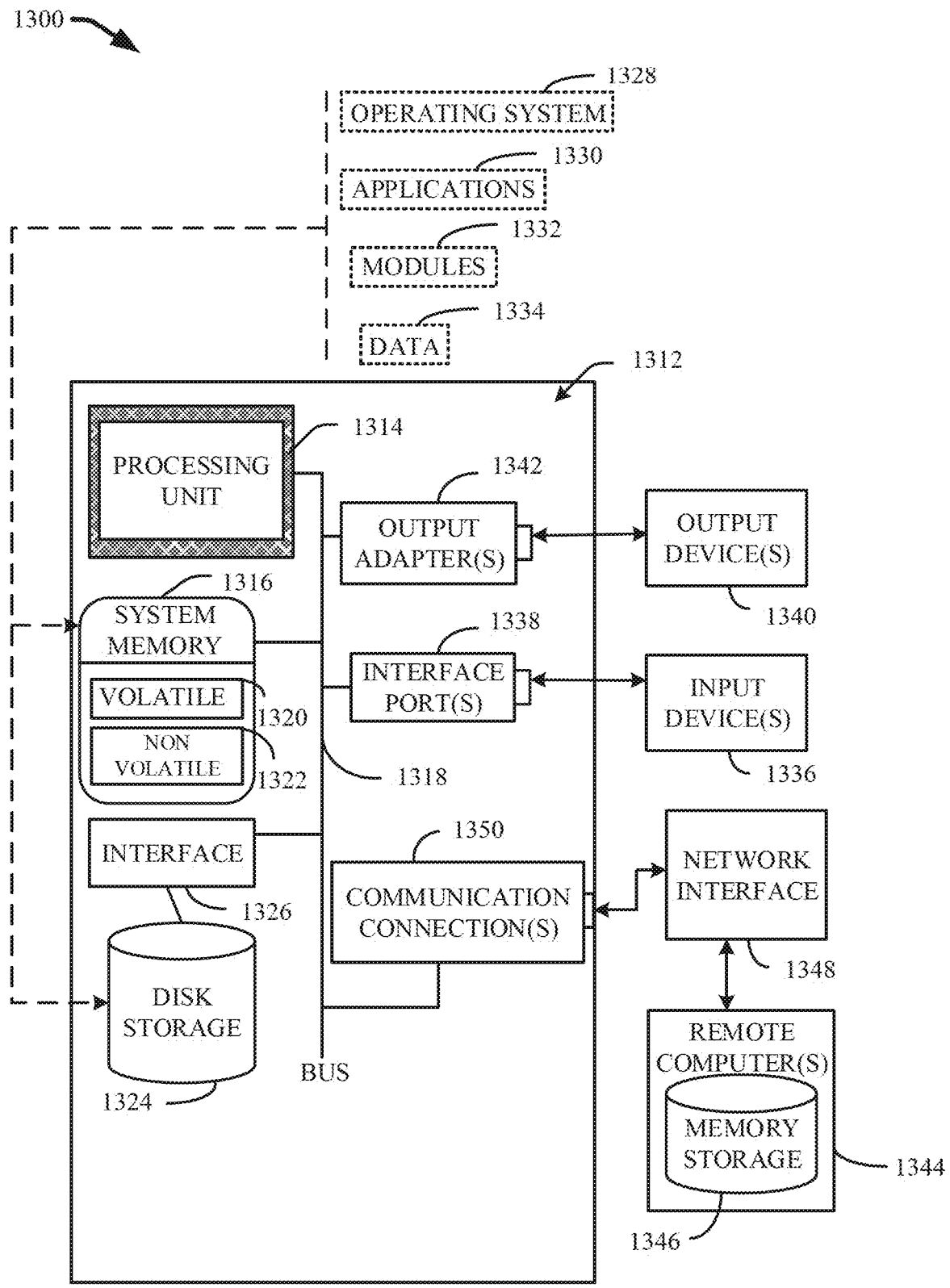
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1301. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
analyzing, by a plurality of drone devices respectively operatively coupled to processors, a physical environment of a geographic area in which one or more animals are located to generate respective environment information about the physical environment, wherein the analysis is performed using respective instruments of drone devices of the plurality of drone devices;
selecting, by a drone device of the plurality of drone devices based on the respective environment information received by the drone device from other drone devices of the plurality of drone devices via a communication network, a defined region, of a defined coordinate space of the geographic area, that surrounds the one or more animals, where the defined region is selected to mitigate at least one risk of the physical environment to the one or more animals, wherein the selecting comprises:
determining a water feature of the physical environment based on the respective environment information,
determining a capability of the one or more animals with respect to the one or more animals interacting with the water feature in relation to the at least one risk to the one or more animals, and
including a portion of the water feature in the defined region that is selected based on the determined capability of the one or more animals in relation to the portion of the water feature;
communicating, by the drone device via the communication network, data indicating the defined region to the other drone device;
maintaining, by the plurality of drone devices based on the data indicating the defined region, a virtual fence around the defined region; and
monitoring, by the plurality of drone devices, respective physical relationships between the one or more animals and the defined region.

2. The computer-implemented method of claim 1, further comprising:
in response to identifying that the physical relationship between an animal of the one or more animals and the defined region fails to meet a criterion, performing, by the plurality of drone devices, a pattern of operations selected to alter the physical relationship between the animal and the defined region to satisfy the criterion.

3. The computer-implemented method of claim 2, wherein the pattern of operations comprises a movement pattern of the plurality of drone devices.

4. The computer-implemented method of claim 2, wherein the pattern of operations comprises a visual indication presented by a drone of the plurality of drone devices.

5. The computer-implemented method of claim 2, wherein the pattern of operations comprises an audio indication presented by a drone device of the plurality of drone devices.

6. The computer-implemented method of claim 2, wherein the pattern of operations comprises a physical stimulation presented by a drone device of the plurality of drone devices.

7. The computer-implemented method of claim 2, wherein the monitoring is performed using the respective instruments of the drone devices.

8. The computer-implemented method of claim 2, wherein the monitoring comprises identifying a defined condition predicted to cause the physical relationship between the animal and the defined region fail to satisfy the criterion.

9. The computer-implemented method of claim 8, wherein the defined condition comprises the identification of a predator animal, and the performing the pattern of operations comprises performing an action to drive the predator animal to a defined distance away from the defined coordinate space.

10. The computer-implemented method of claim 2, wherein the pattern of operations is selected according to a learning algorithm that learns a behavior of the animal relative to the defined region.

11. The computer-implemented method of claim 2, wherein the pattern of operations is selected according to a learning algorithm that learns effectiveness of an operation performed by a drone device of the plurality of drone devices relative to alteration of the physical relationship between the animal and the defined region.

12. The computer-implemented method of claim 1, further comprising modifying, by the at least one drone of the plurality of drone devices, the defined region based on a defined condition in the physical environment detected by at least one drone of the plurality of drone devices.

13. A computer program product for managing one or more virtual boundaries of a defined region, the computer program product comprising a non-transitory computer readable storage medium having program instructions embodied therewith, the program instructions executable by a drone device to cause the drone device to:
   analyze, using at least one instrument of the drone device, a physical environment of a geographic area in which one or more animals are located to generate environment information about the physical environment;
   receive, via at least one communication link from at least one other drone device, respective other environment information about the physical environment generated by the at least one other drone device;
   select, based on the environment information and the respective other environment information, a defined region, of a coordinate space of the geographic area, that surrounds the one or more animals, wherein the defined region is selected to mitigate at least one risk of the physical environment to the one or more animals, wherein the selection of the defined region comprises:
      determine a water feature of the physical environment based on the environment information and the respective environment information,
      determine a capability of the one or more animals with respect to the one or more animals interacting with the water feature in relation to the at least one risk to the one or more animals, and
   include a portion of the water feature in the define region that is chosen based on the determined capability of the one or more animals in relation to the portion of the water feature;
   monitor, with the at least one other drone device, one or more virtual boundaries of the defined region;
   determine a violation associated with the one or more virtual boundaries of the defined region based on the monitoring;
   determine one or more actions to perform by the drone device and the at least one other drone device to continue to monitor the one or more virtual boundaries of the defined region and mitigate the violation associated with the one or more virtual boundaries of the defined region; and
   perform, via communication of data indicating the one or more actions using the at least one communication link with the at least one other drone device, the one or more actions.

14. The computer program product of claim 13, wherein the violation comprises an animal of the one or more animals being located outside of the defined region and a status associated with the animal indicating that the animal is to be maintained inside the defined region.

15. The computer program product of claim 14, wherein the one or more actions comprises using one or more instruments of the drone device to produce one or more stimuli to drive the animal back into the defined region.

16. The computer program product of claim 13, wherein the violation comprises of the one or more animals being animal being located inside of the defined region and a status associated with the animal indicating that the animal is to be maintained outside of the defined region.

17. The computer program product of claim 16, wherein the one or more actions comprises using one or more instruments of the drone device to produce one or more stimuli to drive the animal out of the defined region.

18. A drone device, comprising:
   a memory that stores computer executable components; and
   a processor that executes the computer executable components stored in the memory, wherein the computer executable components comprise:
      a boundary component that:
         analyzes, using at least one instrument of the drone device, a physical environment of a geographic area in which one or more animals are located to generate environment information about the physical environment;
         selects, based on the environment information, a defined region, of a coordinate space of the geographic area, that surrounds the one or more animals, wherein the defined region is selected to mitigate at least one risk of the physical environment to the one or more animals, wherein the selection of the defined region comprises:
            determine a water feature of the physical environment based on the environment information and the respective environment information,
            determine a capability of the one or more animals with respect to the one or more animals interacting with the water feature in relation to the at least one risk to the one or more animals, and
            include a portion of the water feature in the define region that is chosen based on the determined capability of the one or more animals in relation to the portion of the water feature;
      a monitoring component that determines, based on information related to maintaining the defined region exchanged with at least one other drone device, whether a violation associated with a virtual boundary of the defined region has occurred; and
      a violation response component that determines an action to be performed by the drone device to mitigate the violation.

19. The drone device of claim 18, wherein the violation response component also implements the action to be performed by the drone device.

20. The drone device of claim 18, wherein the violation response component also learns additional information associated with effectiveness of actions performed to mitigate violations of the virtual boundary of the defined region.

* * * * *